United States Patent
Gao

(10) Patent No.: US 8,752,768 B2
(45) Date of Patent: Jun. 17, 2014

(54) SYSTEMS AND METHODS FOR READING COLOR OPTICAL CODES

(71) Applicant: WenLiang Gao, Eugene, OR (US)

(72) Inventor: WenLiang Gao, Eugene, OR (US)

(73) Assignee: Datalogic ADC, Inc., Eugene, OR (US)

(*) Notice: Subject to any disclaimer, the term of this patent is extended or adjusted under 35 U.S.C. 154(b) by 0 days.

(21) Appl. No.: 13/678,984

(22) Filed: Nov. 16, 2012

(65) Prior Publication Data

US 2013/0126618 A1 May 23, 2013

Related U.S. Application Data

(60) Provisional application No. 61/561,153, filed on Nov. 17, 2011.

(51) Int. Cl.
G06K 7/12 (2006.01)

(52) U.S. Cl.
USPC ..................... 235/469; 235/462.41

(58) Field of Classification Search
USPC ........................... 235/469, 462.41
See application file for complete search history.

(56) References Cited

U.S. PATENT DOCUMENTS

| | | | |
|---|---|---|---|
| 5,335,082 A | 8/1994 | Sable | |
| 6,308,893 B1 | 10/2001 | Waxelbaum et al. | |
| 6,749,120 B2 | 6/2004 | Hung et al. | |
| 6,976,629 B2 | 12/2005 | Carlson | |
| 7,077,323 B2 | 7/2006 | Takakura et al. | |
| 7,604,174 B2 | 10/2009 | Gerst, III et al. | |
| 7,646,029 B2 | 1/2010 | Mueller et al. | |
| 7,772,533 B2 * | 8/2010 | Brock et al. | 250/208.1 |
| 8,096,475 B2 * | 1/2012 | Perera et al. | 235/454 |
| 2002/0066786 A1 | 6/2002 | Saito | |
| 2004/0169846 A1 | 9/2004 | Ross | |
| 2005/0011956 A1 | 1/2005 | Carlson | |
| 2006/0202036 A1 | 9/2006 | Wang et al. | |
| 2006/0274171 A1 | 12/2006 | Wang | |

(Continued)

FOREIGN PATENT DOCUMENTS

| | | |
|---|---|---|
| KR | 10-2007-0015101 A | 2/2007 |
| WO | WO 2005/012997 A2 | 2/2005 |
| WO | WO 2008/075898 A1 | 6/2008 |

OTHER PUBLICATIONS

Orion® Telescopes & Binoculars, "Orion StarShoot Deep Space Monochrome Imaging Camera III," http://www.telescope.com/Astrophotography/Astrophotography-Cameras/Orion-StarShoot-Deep-Space-Monochrome-Imaging-Camera-III/pc/-1/c/4/sc/58/p/52076.uts, visited on Sep. 14, 2011.

(Continued)

*Primary Examiner* — Christle I Marshall
(74) *Attorney, Agent, or Firm* — Stoel Rives LLP; Robert R. Teel

(57) ABSTRACT

Methods and systems are disclosed for producing color-image data representative of a color optical code or other color objects, particularly with a monochrome imager. Monochrome image-sensor data is produced by receiving a sequence of colored light emitted by an artificial light source and reflected from the color object. The sequence of colored light may be a red, green, and blue sequence of colored light emitting diode lights according to some embodiments. The monochrome imager produces the monochrome image-sensor data based at least in part on the portion of the reflected sequence of colored light. The monochrome image-sensor data is processed to produce color-image data representing the color optical code.

27 Claims, 17 Drawing Sheets

(56) References Cited

U.S. PATENT DOCUMENTS

2007/0139638 A1    6/2007    Wolpert et al.
2009/0189775 A1    7/2009    Lashina et al.
2009/0244653 A1    10/2009   Hashimoto
2011/0096181 A1    4/2011    Carlson et al.
2011/0205605 A1*   8/2011    Suga ............................ 358/513
2011/0222763 A1*   9/2011    Milgrom et al. .............. 382/165

OTHER PUBLICATIONS

International Searching Authority; "International Search Report and Written Opinion;" PCT/US2012/065607; Mar. 29, 2013.

* cited by examiner

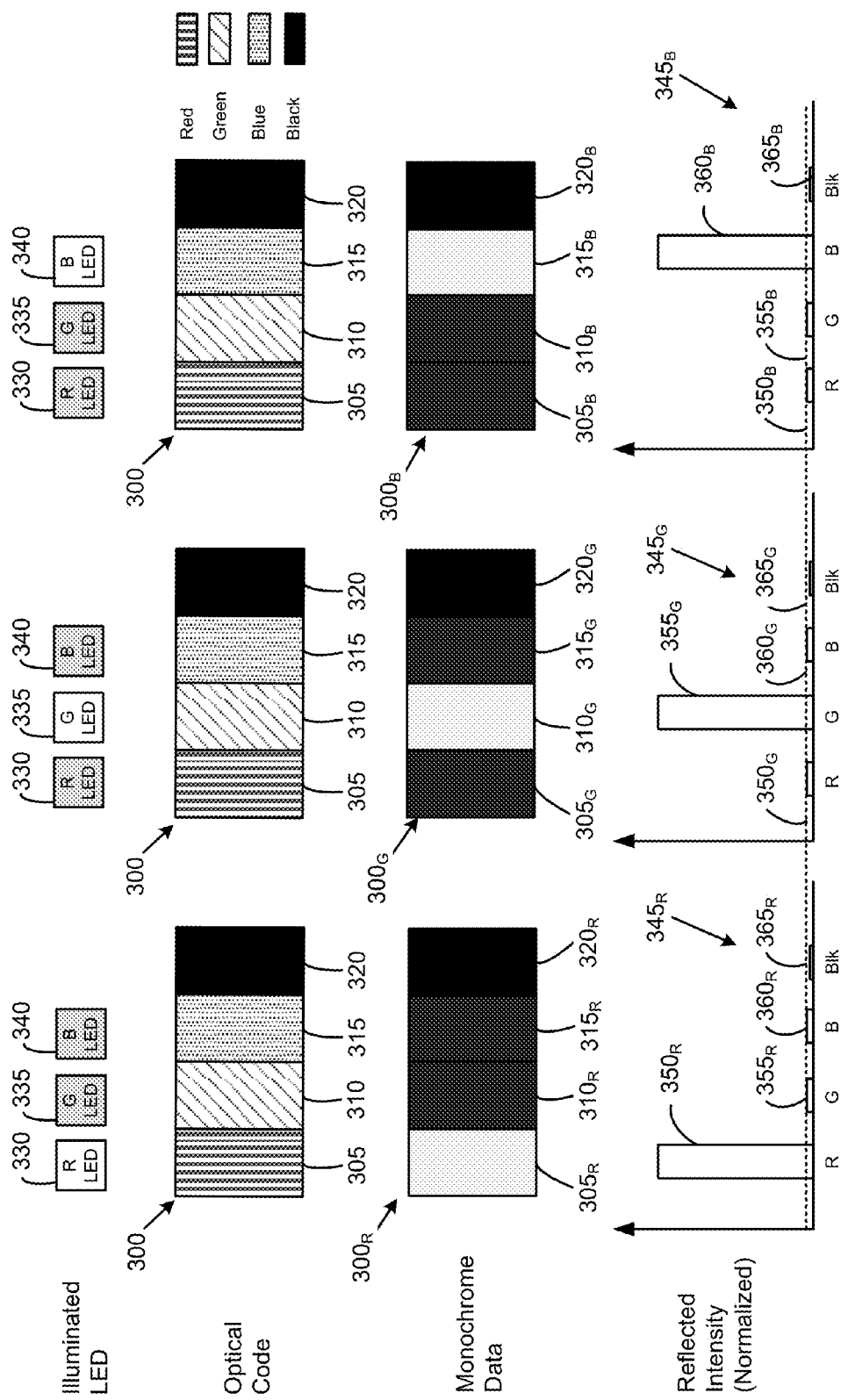

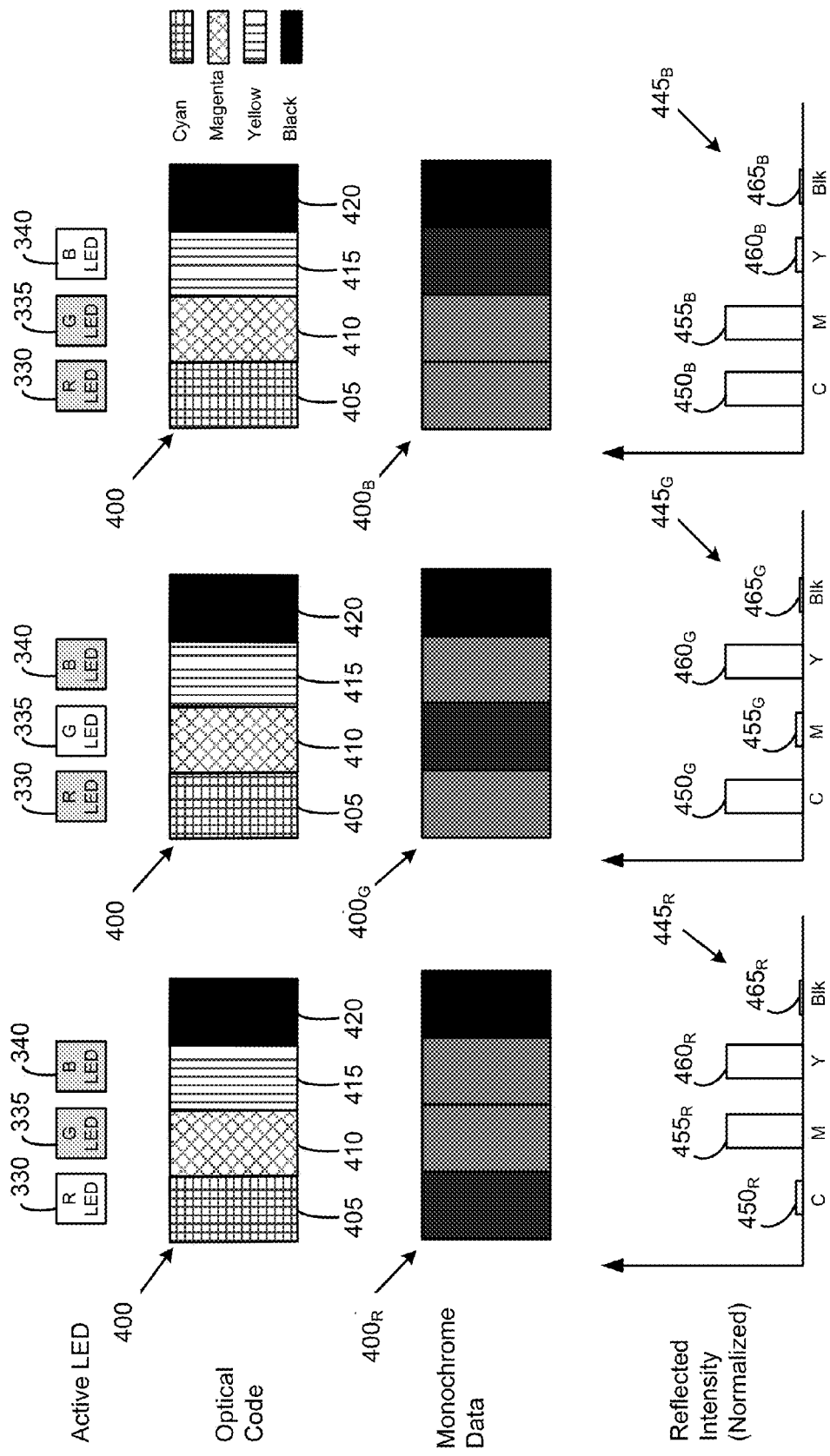

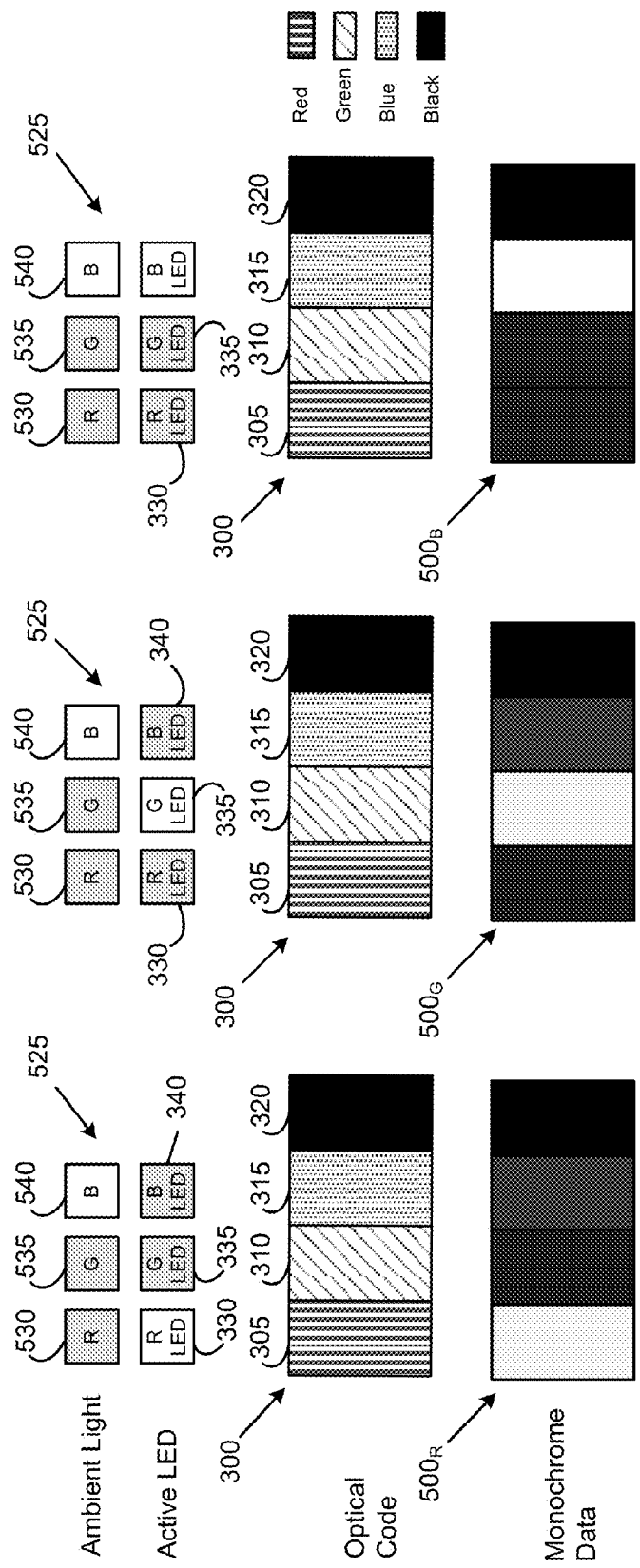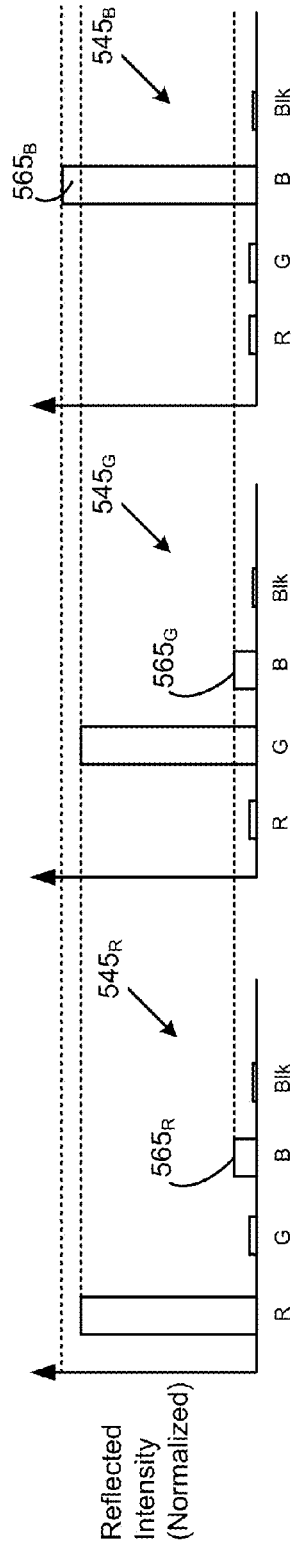
Fig. 5A  Fig. 5B  Fig. 5C

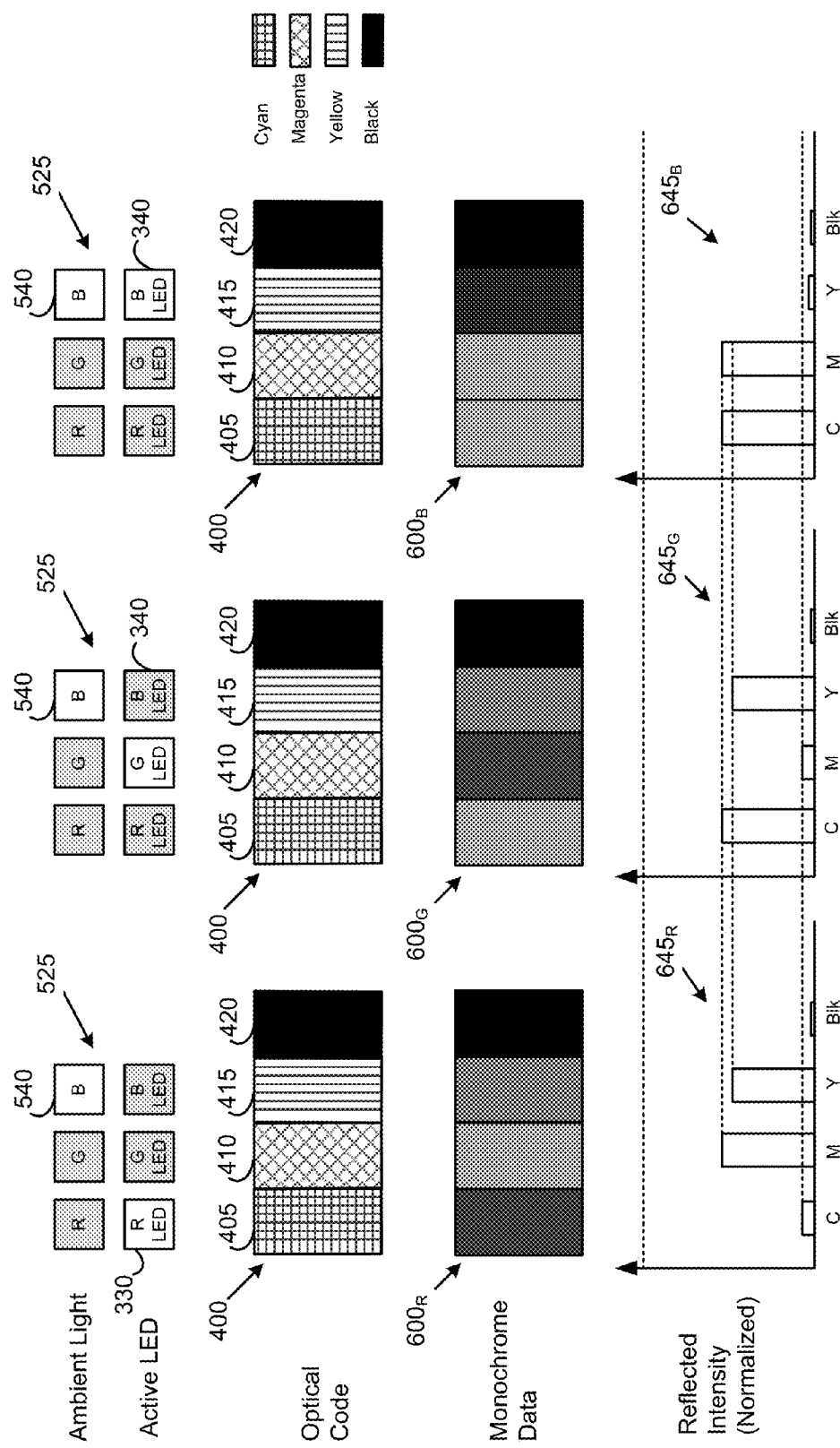

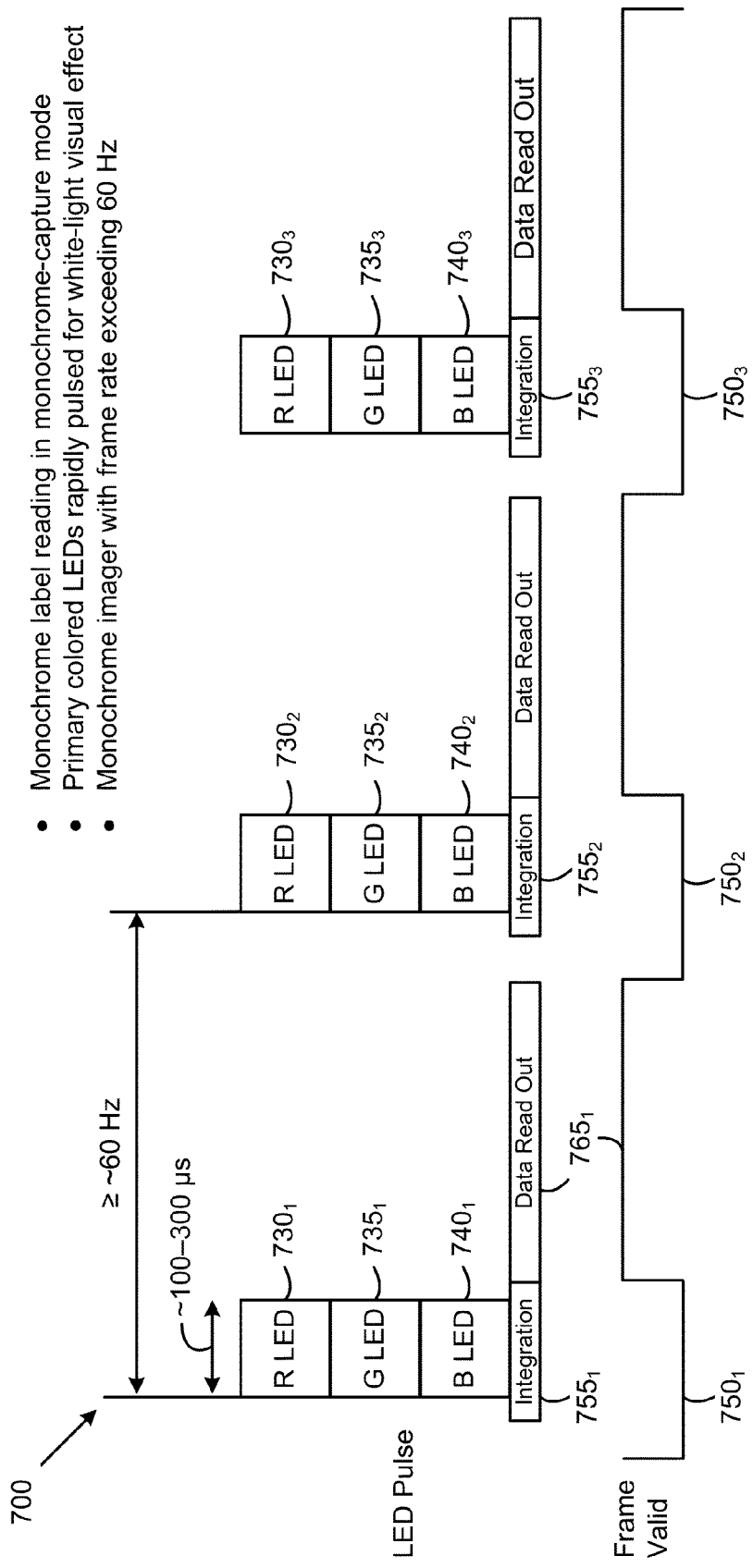

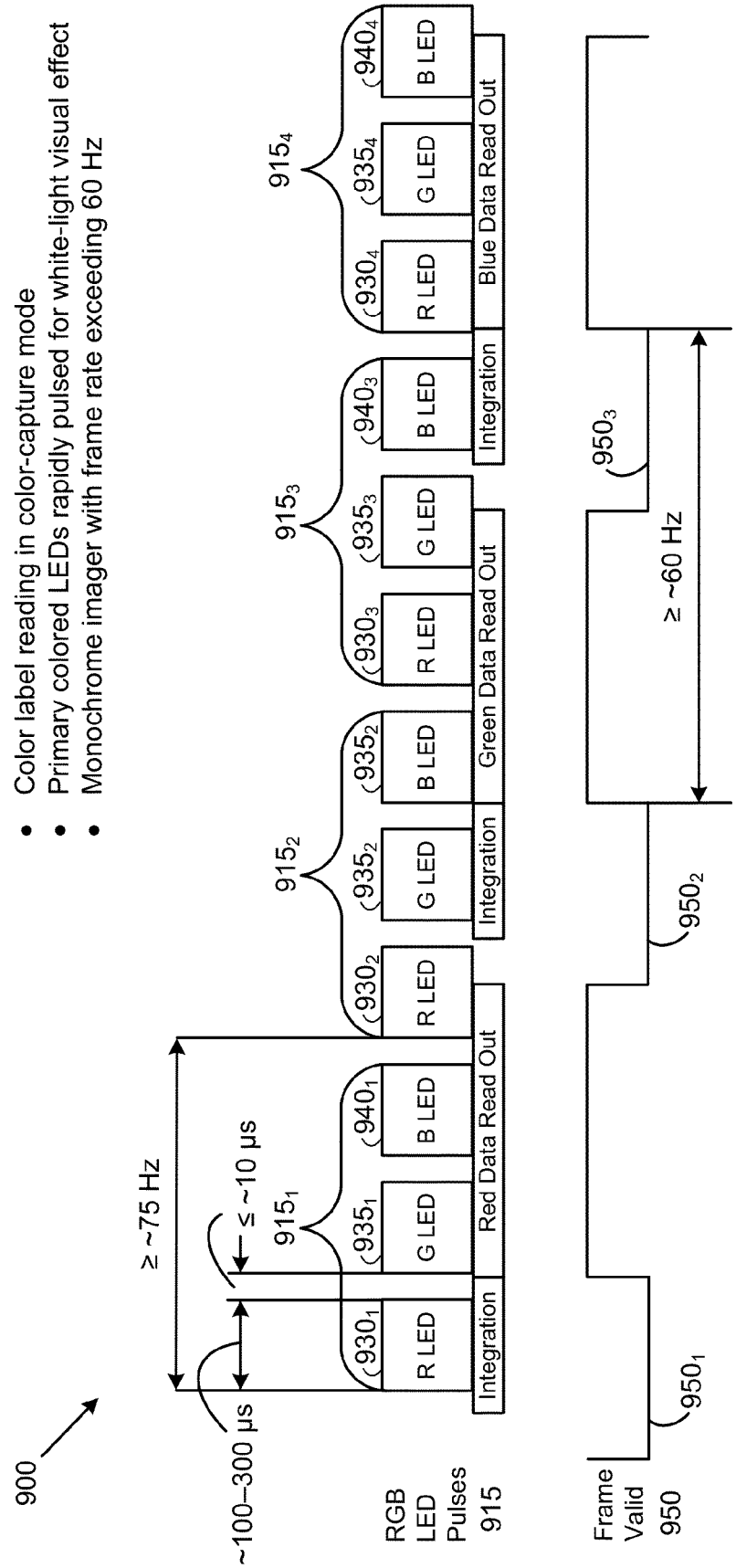

SYSTEMS AND METHODS FOR READING COLOR OPTICAL CODES

RELATED APPLICATIONS

This application claims the benefit under 35 U.S.C. §119 (e) of U.S. Provisional Patent Application No. 61/561,153, filed Nov. 17, 2011, which is hereby incorporated by reference in its entirety.

BACKGROUND

The field of this disclosure relates generally to systems and methods of data reading, and more particularly, but not exclusively, to reading color optical codes with a monochrome image sensor.

Optical codes are positioned on, or associated with, an object and encode useful, optically-readable information corresponding to an item or a class of items. For example, the optical codes may be associated with packaging of retail, wholesale, and inventory goods; retail product presentation fixtures (e.g., shelves); goods and inventory undergoing manufacturing; personal or company assets; and documents, including website URLs. An optical code data reader (or simply data reader) configured to read and decode the optical code can be used to retrieve the information corresponding to an item or class of items.

Perhaps the most common example of an optical code is a linear or one-dimensional (1D) barcode, such as a UPC code. Linear barcodes are just one example of the many types of optical codes in use today. Higher-dimensional (e.g., 2D) codes, which are also sometimes referred to as barcodes, include stacked barcodes (e.g., PDF-417 code), and matrix codes (e.g., Datamatrix code, QR code, or Maxicode).

Conventional barcodes have generally used two contrasting colors to encode information. A UPC code, for example, consists of alternating bars (i.e., relatively dark areas) and spaces (i.e., relatively light areas). The pattern of alternating bars and spaces and the widths of those bars and spaces represent a string of binary digits, where the width of any particular bar or space is an integer multiple of a specified minimum width that is called a module or unit. Similarly, in QR codes, for example, the optical code consists of black square modules arranged in a grid pattern on a white background.

Another type of 2D code may include color modules, as in High Capacity Color Barcodes (HCCBs). Unlike two-color optical codes, an HCCB uses a grid of equally shaped colored triangles to encode data. Depending on the informational storage needed, the grid size (i.e., the total number of symbols), symbol density (i.e., the printed size of the triangles), and symbol count (i.e., number of colors used) may vary. An HCCB can use an eight-, four-, or two-tone palette (e.g., black-and-white).

Different methods and systems of data readers are available for reading an optical code and for decoding the information represented by the optical code. For example, one- and two-dimensional optical codes have been read with image-based optical code readers. Image-based optical code readers include image sensors. The image sensors typically include charge coupled devices (CCDs) or complementary metal oxide semiconductor (CMOS) image sensors that generate data representing a captured image of an optical code. Because optical codes most often include contrasting dark and light patterns (e.g., black and white) to represent binary data, image-based data readers usually include image sensors of the monochrome type. However, a color sensitive image sensor is typically needed to read and distinguish different colors and thereby decode a color optical code.

SUMMARY OF THE DISCLOSURE

According to some embodiments, methods and systems are disclosed for reading color optical codes with a monochrome image sensor, or producing color-image data with a monochrome image sensor. In another embodiment, a system is disclosed including a data reader having a monochrome image sensor and an artificial light source configured to produce a sequence of colored light. The sequence of colored light may be an RGB sequence with the red, green, and blue light being produced during temporally spaced apart intervals, according to one embodiment. The RGB sequence is reflected from an optical code and received by the monochrome image sensor to produce monochrome image-sensor data for each color of light in the sequence. The image-sensor data may then be used to represent and decode the color optical code.

In another embodiment, a method and system include providing a data reader status indicia using colored light from an artificial light source that also may be used to generate color-image data from a monochrome image sensor.

In yet another embodiment, a method and system include illuminating an object with pulsed colored light that is pulsed at a sufficiently fast rate to appear to a human as a non-pulsed solid color, while also using the pulsed colored light to reflect from an optical code for producing monochrome image-sensor data that may be used to represent colored objects.

In still a further embodiment, a method and system include determining whether an optical code is monochromatic or colored. Such a determination may be made by comparing differences or similarities from separate monochrome image-sensor data sets where the data corresponds to intensity of reflections from differently colored light reflected from similar locations of an object. Some embodiments determine whether an optical code is monochromatic or colored by detecting one or more features, geometric shapes, or symbology of color or monochrome optical codes.

Yet another embodiment includes dynamically switching between monochrome-capture mode and color-capture mode based on a determination of whether an optical code is monochromatic or colored by comparing differences or similarities from separate monochrome image-sensor data sets where the data corresponds to intensity of reflections from differently colored light reflected from similar locations of an object, or by detecting one or more features, geometric shapes, or symbology of color or monochrome optical codes.

Additional aspects and advantages will be apparent from the following detailed description of preferred embodiments, which proceeds with reference to the accompanying drawings.

BRIEF DESCRIPTION OF THE DRAWINGS

FIGS. 3A, 3B, and 3C are diagrams showing a prophetic example of a red-green-blue-black optical code exposed to a red, green, and blue (RGB) sequence of colored light during a color-capture mode light emitting diode (LED) sequence used to produce corresponding monochrome image-sensor data having reflected colored light intensities indicated by associated histograms.

FIGS. 4A, 4B, and 4C are diagrams showing a prophetic example of a cyan-magenta-yellow-black optical code exposed according to a similar RGB sequence of FIGS. 3A, 3B, and 3C.

FIGS. 5A, 5B, and 5C are diagrams depicting an additional blue-hued ambient light included during the prophetic color-capture mode sequence of the corresponding FIGS. 3A, 3B, and 3C.

FIGS. 6A, 6B, and 6C are diagrams depicting an additional blue-hued ambient light included during the prophetic color-capture mode sequence of the corresponding FIGS. 4A, 4B, and 4C.

FIGS. 7A and 7B are respectively, high-level and low-level timing diagrams showing a monochrome-capture mode having concurrent color-LED illumination control pulses of at least 60 Hertz (Hz), with FIG. 7B including blue LED control pulses synchronizing camera trigger pulses during frame-valid pulses of a monochrome image sensor having a frame rate of at least 60 Hz.

FIGS. 9A, 9B, and 9C are, respectively, a high-level and two low-level timing diagrams showing a color-capture mode having sequenced color-LED illumination control pulses of at least 75 Hz (FIGS. 9A and 9B) and 60 Hz (FIG. 9C), with FIG. 9B including camera trigger pulses synchronizing the LED control pulses during frame-valid pulses of a monochrome image sensor having a frame rate of at least 60 Hz, and FIG. 9C including blue LED control pulses synchronizing the camera trigger pulses during the frame-valid pulses.

DETAILED DESCRIPTION OF EMBODIMENTS

The described features, structures, characteristics, and methods may be combined in any suitable manner in one or more embodiments. In view of the disclosure herein, skilled persons will recognize that the various embodiments can be practiced without one or more of the specific details or with other methods, components, materials, or the like. In other instances, well-known structures, materials, or operations are not shown or not described in detail to avoid obscuring aspects of some embodiments. For convenience, the methods and systems may be described herein with reference to optical codes; however, it is understood that the methods described herein are applicable to any host computer and to any type of optically readable code, such as, but not limited to, those described above, bio-information such as fingerprints, retina patterns, blood vessel patterns, facial features, and other suitable codes.

Monochrome image sensors impart uniform sensitivity and spectral response for each pixel sensor of the image sensor; the photosensors detect light intensity with little or no wavelength specificity. Monochromatic shades range from black to white (i.e., grayscale). Therefore, a grayscale image contains only shades of gray and no color. Each pixel, however, has a luminance value, regardless of its color. Luminance can be described as brightness or intensity, which can be measured on a scale from black (zero intensity) to white (full intensity). Most image file formats support a minimum of 8-bit grayscale, which provides $2^8$ or 256 levels of luminance per pixel. Some formats support 16-bit grayscale, which provides $2^{16}$ or 65,536 levels of luminance.

Conversely, color image sensors typically separate light into color components using a grid array of pixel-level color pre-filters, prisms, or stacked photodiodes that responds to different wavelengths of light. Color digital images can be saved as grayscale (or black and white) images, because even color images contain grayscale information.

The present inventor has recognized that some image-based data readers have included color imagers, but such data readers have not effectively achieved high-speed decoding or high-resolution imaging of contrasting dark and light patterns. The present inventor has also recognized that typical monochrome images ordinarily cannot suitably differentiate between different colors that may reflect similar light intensities and therefore have not been used to read color optical codes.

Figure 1A:
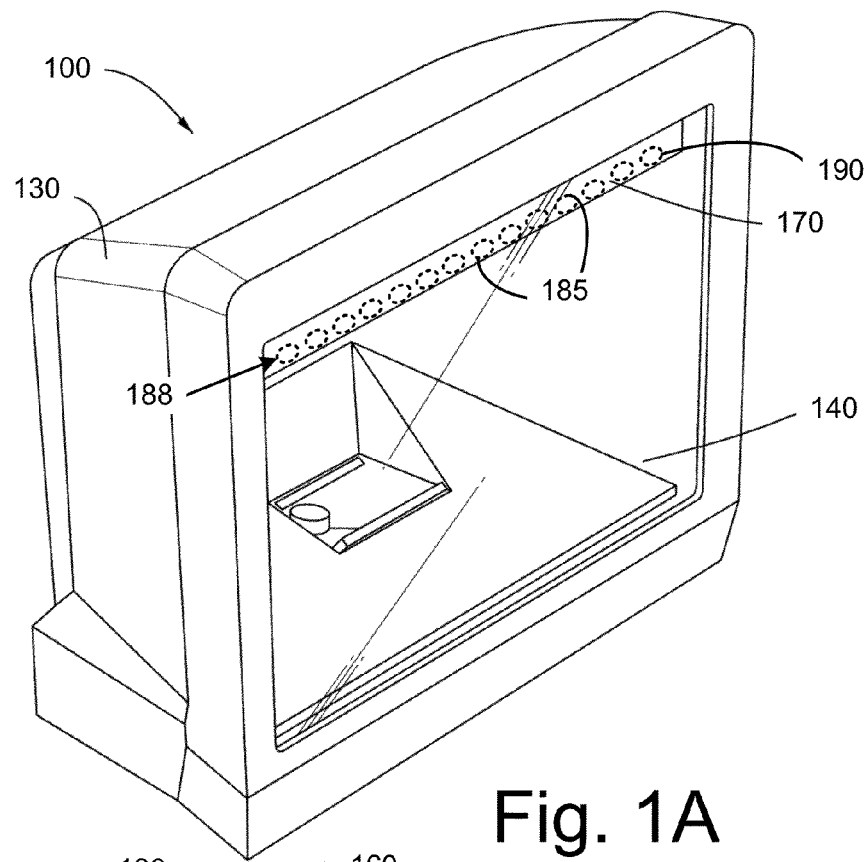
FIG. 1A is an isometric view of a data reader, according to one embodiment.
Figure 1B:
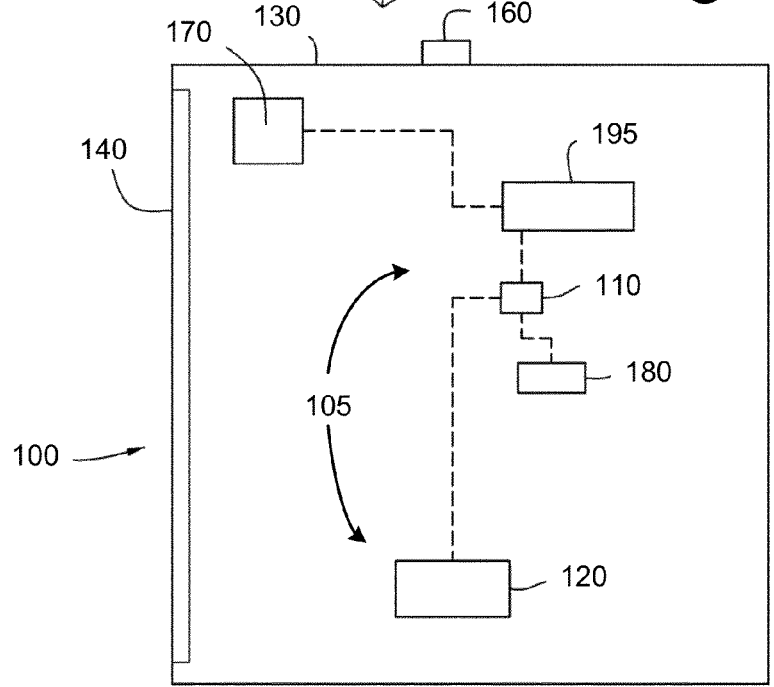
FIG. 1B is a hardware block diagram of the data reader of FIG. 1A.

FIG. 1A is an isometric view of a data reader 100 in accordance with one embodiment. FIG. 1B is a block diagram of some electronics 105 of data reader 100. Data reader 100 includes a processor (for example, a micro processing unit referred to as MPU 110), or other computing device such as a complex programmable logic device (CPLD), configured to control a sequence of colored light and to synchronize exposure times of a monochrome imager 120 (or simply, imager 120) according to the illumination times for different colors in the sequence. As explained in detail below, the sequence of colored light, in conjunction with the coordinated exposure times of monochrome imager 120 cooperatively establish monochrome image-sensor data that may be used to decode color optical codes, similar to conventional color-image data obtained from a color imager. In other words, the monochrome image-sensor data can be combined to represent a color palette, thereby providing color-image data. Creating such monochrome image-sensor data that corresponds to color-image data may facilitate reading and decoding color barcodes while maintaining high-speed decoding and high-resolution imaging characteristics of data readers having monochrome image sensors.

Data reader 100 (or simply reader or scanner) is suitable for reading optical codes, symbols, or other items. Data reader 100 includes an outer housing 130 and a window portion 140 that collectively protect operative electronics 105 from the outside environment. Data reader 100 may operate as a hands-free presentation scanner, either self-supported atop a horizontal surface (e.g., a checkstand) or mounted to a wall or other surface. Data reader 100 may also be grasped about outer housing 130 and operated in a hand-held or portable mode. In hands-free self-supported, hands-free mounted, or hand-held modes data reading operation may be activated by actuation of a trigger 160 (FIG. 1B), automatically in response to processor 110 detecting the presence of an item within a read volume in front of window 140, in a continuous-scan mode that continuously captures and attempts to decode images while data reader 100 is activated, or some other suitable activation mode.

Imager 120, alone or together with logic components such as a CPLD or a field-programmable gate array (FPGA), is coupled to MPU 110. In some embodiments, imager 120 includes a CMOS image sensor with associated optics (not shown) having a field of view including the read volume within which a target item is preferably presented for imaging. Therefore, the term imager generally refers to an image sensor, and typical an image sensor with associated optics. A CMOS image sensor may comprise an active-pixel imaging sensor with a global shutter, such as a model EV76C560BB CMOS sensor available from e2v of Saint-Egrève Cedex, France, or may comprise a rolling shutter. In some embodiments, CCD or other suitable image sensor may be used.

MPU 110 may comprise any suitable digital processor, such as a low-power DSP core or ARM core processor. In some embodiments, MPU 110 comprises an ARMS processor AT91SAM9G20 available from Atmel of San Jose, Calif., USA, or an OMAP processor available from Texas Instruments of Dallas, Tex., USA or an i.MX1 series processor (such as the MC9328MX1 processor) available from Freescale Semiconductor, Inc. of Austin, Tex., USA. In some embodiments, multiple processors or sub-processors or other types of processor electronics such as comparators or other specific function circuits may be used alone or in combination. For the purposes of this description, the term processor is meant to include any of these combinations. A memory 180, such as a flash memory, random access memory, or other suitable memory, communicates with MPU 110. Alternately, memory 180 may be integrated with MPU 110. MPU 110 is programmed to control operation and timing of colored LEDs in illumination source 170, coordinate the exposure time of imager 120, and among other functions, select monochrome- or color-capture modes, or select monochrome- or color-decoding modes for example, as explained below.

Illumination source 170 comprises an artificial light source having an array of one or more LEDs, for example, infrared or visible spectrum LEDs, or may alternatively comprise another suitable light source, such as a lamp or laser diode. Illumination source 170 may be coupled to and controlled by processor 110, or may be remotely mounted, powered, and controlled as a separate module apart from data reader 100. In one embodiment, illumination source 170 comprises LEDs 185 that are aligned to form a strip 188 of LEDs 185 behind window 140. An optional light diffuser 190 is located between the window 140 and the strip 188 of LEDs 185. In one embodiment, strip 188 of LEDs 185 includes a repeating series of horizontally mounted and aligned red, green, and then blue LEDs that repetitively extends across the width of window 140. In another embodiment (not shown), strip 188 of LEDs 185 includes multiple horizontally aligned clusters of red-, green-, and blue-LEDs. In some embodiments, the horizontally aligned clusters are formed with tri-colored LEDs that include red-, green-, and blue-light diode portions, or other suitable color combinations. An example of a tri-colored LED is model ASMT-MT00 Moonstone® available from Avago Technologies, Inc. of San José, Calif. A power supply circuit 195 is provided for energizing LEDs 185 to illuminate and reflect light from an optical code to generate reflected light for reception by imager 120.

The LEDs 185 may be also be used for emitting colored light to indicate the status of data reader 100 and of various data reader 100 operations. For example, green LEDs may be activated while the other colors of LEDs are inactive to indicate that data reader 100 has obtained a good read of an optical code. In some embodiments, flashing or different color sequences are used to indicated the status or progress of software or firmware loading. LEDs 185 are used in some embodiments as a Field Replaceable Unit type of indication, or for product version or identification. For example, a particular color code or sequence of colors may be emitted when data reader 100 is activated to identify or characterize aspects of data reader 100 hardware or software.

Figure 2B:
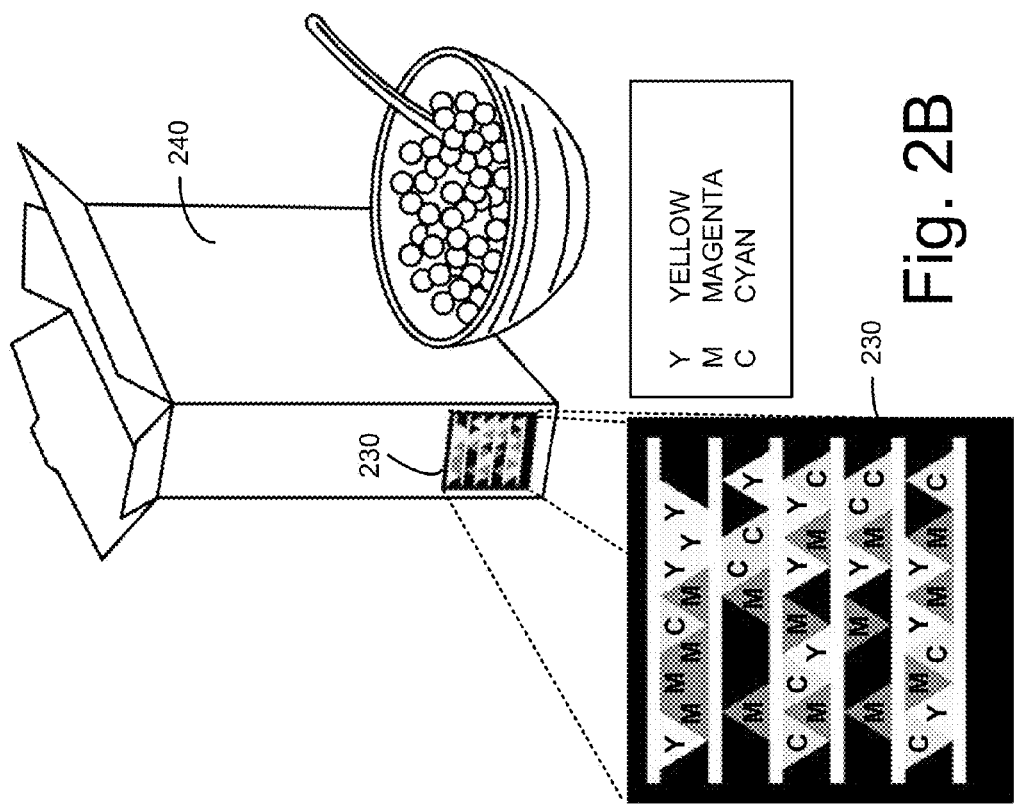
FIGS. 2A and 2B are each isometric views of objects bearing, respectively, a UPC and an HCCB optical code (enlarged in FIG. 2B).
Figure 2A:
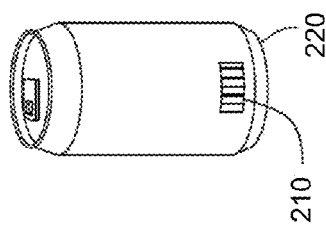

Illumination source 170 is operable and configured to illuminate an optical code on an item presented to data reader 100. For example, FIG. 2A shows a 1D optical code in the form of UPC 210 on a beverage can 220. FIG. 2B shows a 2D optical code in the form of an HCCB 230 on cereal box 240. As explained below, either code 210 or 230 may be read by presenting corresponding item 220 or 240 into the read volume (not shown) in front of window 140. While optical code 210 or optical code 230 is in front of window 140, illumination source 170 is activated to emit a sequence of colored light according to a monochrome-capture mode (FIG. 7A, 7B, or 8) or color-capture mode (FIG. 9A, 9B, 9C, or 10). In either mode, the sequence of emitted colored light is reflected from optical codes 210 or 230, and a portion of that reflected light is received by monochrome imager 120 to produce data representing optical code 210 or 230.

FIGS. 3A, 3B, and 3C show a red-green-blue-black optical code 300 exposed to an RGB sequence of colored light during a color-capture mode light sequence used to produce corresponding monochrome image-sensor data having reflected colored light intensities indicated by associated histograms. Red-green-blue-black optical code 300 includes four horizontally aligned rectangular adjacent modules that are colored and arranged in the following sequence (from left to right): red module 305, green module 310, blue module 315, and black module 320. Optical code 300 is shown exposed to an RGB sequence of colored light (or simply, RGB sequence) including light emitted from a red LED 330 in FIG. 3A, a green LED 335 in FIG. 3B, and a blue LED 340 in FIG. 3C. (Illuminated LEDs are shown as white; non-activated LEDs are shown in gray.) Emitted light from each illuminated LED 330, 335, and 340 is reflected from optical code 300 and received by monochrome imager 120 (FIG. 1B) to produce corresponding monochrome image-sensor data represented by red-light monochrome data $300_R$ (denoted with subscript R in FIG. 3A), green-light monochrome data $300_G$ (subscript G in FIG. 3B), and blue-light monochrome data $300_B$ (subscript B in FIG. 3C).

Monochrome data $300_R$, $300_G$, and $300_B$ represent image-sensor data produced from pixel sensors among a pixel sensor matrix of monochrome imager 120 during the RGB sequence. For example, red-light monochrome data $300_R$ of FIG. 3A includes red-bar data $305_R$ that represents red light emitted by red LED 330, which is reflected from red module 305 and received by monochrome imager 120. Red-light monochrome data $300_R$ also includes green-bar data $310_R$ that represents light reflected from green module 310; blue-bar data $315_R$ that represents light reflected from blue module 315; and black-bar data $320_R$ that represents light reflected from black module 320. Similarly, blue-light monochrome data $300_R$ of FIG. 3C includes, for example, green-bar data $310_B$ that represents light reflected from green module 310 and received by monochrome imager 120 while blue LED 340 is illuminated.

During the red-light portion of the RGB sequence (i.e., red LED active, FIG. 3A), for example, red module 305 is highly reflective of red light (e.g., red-bar data $305_R$ appears to monochrome imager 120 as near white to indicate relatively high reflection), while green and blue modules 310, 315 are relatively unreflective of red light (e.g., green- and blue-bar data $310_R$ and $315_R$ appear to monochrome imager 120 as dark gray to indicate relatively low reflection). Black-bar data $320_R$ shows virtually no red-light reflection and appears to monochrome imager 120 as black. In other words, the red pigment of red module 305 strongly reflects light from red LED 330, while the green pigment of green module 310, the blue pigment of blue module 315, and the black pigment of black module 320 all absorb red light without significant reflection. Similarly, during the green-light portion of the RGB sequence (FIG. 3B), green LED 335 is illuminated and reflected from color optical code 300 to produce green-bar data $310_G$ that appears as near white, indicating relatively high green-light reflection with minimal reflection from any of the other colored modules 305, 315, 320. Finally, FIG. 3C shows blue-bar data $315_B$ that appears as near white, indicating relatively high reflection of blue-light and with minimal reflection from any of the other colored modules 305, 310, 320.

Although reflection intensity values may be obtained for each pixel in monochrome data $300_R$, $300_G$, and $300_B$, for illustrative purposes, histograms $345_R$, $345_G$, and $345_B$ (collectively, histograms 345) each include four vertical columns to indicate relative reflected intensity values for corresponding modules 305-320 during the RGB sequence. The reflected intensity values are associated with the color of emitted light and therefore collectively provide color-image data for representing a color object. For example, due to the high red-light reflection of red module 305 in FIG. 3A, a relatively high reflected intensity value $350_R$ of red-bar data $305_R$ is shown in histogram $345_R$ by intensity value $350_R$. Conversely, red module 305 registers low intensity values $350_G$ and $350_R$ (FIGS. 3B and 3C, respectively) during the respective green- and blue-light portions of the RGB sequence. Intensity values $350_R$, $350_G$, and $350_R$ can also be scaled or normalized according to a white-balance value, mapped to RGB color coordinates according to a conventional RGB color definition system (or other color system), and used as color data to decode color optical codes. Another embodiment includes setting pixel sensor gain (analog or digital) to different values according to white-balance correction coefficients (also referred to as scaling coefficients, or normalization coefficients) obtained during white balancing as discussed below with respect to FIG. 11 (see e.g., step 1140) and FIG. 14.

Although there are various color definition systems, for purposes of this description, RGB color coordinates describe a ratio of red, green, and blue light that collectively represent a particular color in a color space. In some embodiments, RGB color coordinates include red, green, and blue components, with each component represented by an 8-bit color-depth contribution ranging from zero, representing no color contribution, to 255, representing a maximum color contribution. For example, normalized RGB color coordinates for red module 305 may be approximately (255, 10, 10), which corresponds to a shade of red. The coordinates within the parenthesis provide, from left to right, the relative contributions of red, green, and blue colors. Similarly, the RGB color coordinate data for green module 310 is approximately (10, 255, 10); (10, 10, 255) represents blue module 315; and (2, 2, 3) represents a black color of black module 320. In other embodiments, color-depth contributions may include a 16-bit range, or some other range. Regardless of the particular range, the color coordinates for individual pixel sensors may be used to differentiate colors of a color optical code—such as HCCB 230—during a decoding process.

FIGS. 3A, 3B, and 3C include an example sequence of colored light emitted from three primary colored LEDs 330, 335, and 340 (i.e., red, blue, and green). In one embodiment, red LED 330 emits red light having a wavelength range from approximately 620 nanometers (nm) to approximately 740 nm, green LED 335 emits green light having a wavelength range from approximately 490 nm to approximately 570 nm, and blue LED 340 emits blue light having a wavelength range from approximately 440 nm to approximately 490 nm. Primary colors used to represent various colors in the visible spectrum are additive to produce white light. Nevertheless, depending on the color palettes of an optical code, primary colors are optional. For example, fewer colors of light may be used, or non-visible light wavelengths may be used (e.g., infrared). Furthermore, LEDs 330, 335, and 340 may be used to capture optical codes that do not share the same RGB palette of colors as LEDs 330, 335, and 340. For example, FIGS. 4A, 4B, and 4C show a color optical code 400 that includes four horizontally aligned and rectangular adjacent modules that are colored and arranged in the following sequence (from left to right): cyan module 405, magenta module 410, yellow module 415, and black module 420. For ease of description, optical code 400 is a simplified representation of HCCB optical code 230 (FIG. 2B).

As described above, optical code 400 is exposed to a sequence of red, blue, and green light emitted from LEDs 330, 335, and 340. The RGB sequence is reflected from modules 405-420, received by monochrome imager 120 (FIG. 1B), and thereby produces monochrome data $400_R$, $400_G$, and $400_B$. During the red light of FIG. 4A, magenta module 410 and yellow module 415 reflect intermediate values $455_R$ and $460_R$ of red light, with minimal reflection by cyan module 405 and black module 420. During the green light of FIG. 4B, cyan and yellow modules 405, 415 reflect intermediate amounts $450_G$, $460_G$ of light while magenta and black modules 410, 420 reflect virtually no green light. During the blue-light emission of FIG. 4C, cyan module 405 and magenta module 410 reflect relatively equal amounts of blue light to produce intensity values $450_B$ and $455_B$, while yellow module 415 and black module 420 show virtually no blue-light reflection by intensity values $460_B$ and $465_B$ due to blue-light absorption by yellow and black pigments. As explained above, by processing monochrome data $400_R$, $400_G$, and $400_B$ associated with red, blue, and green light, color coordinate data can be generated to represent the actual color of each module 405-420.

FIGS. 5A, 5B, and 5C are similar to the prophetic example of FIGS. 3A, 3B, and 3C, but with an additional ambient light. Thus, monochrome data $500_R$, $500_G$, and $500_B$ resemble monochrome data $300_R$, $300_G$, and $300_B$, but include additional effects of an ambient light source 525. For ease of description, ambient light source 525 is shown deconstructed into its RGB components: red light 530, green light 535, and blue light 540, with only blue ambient light 540 illuminated to represent a moderately blue-hued ambient light. The effects of the blue-hued ambient light incident on optical code 300 are readily observable in histograms $545_R$, $545_G$, and $545_B$. For example, reflection values $565_R$, $565_G$, and $565_B$, all indicate the presence of reflected blue light that is reflected by blue module 315, even when blue LED 340 is not illuminated (FIG. 5A and FIG. 5B). Therefore, the additional intensities indicated by values $565_R$, $565_G$, and $565_B$ result from blue ambient light 540.

Figure 14:
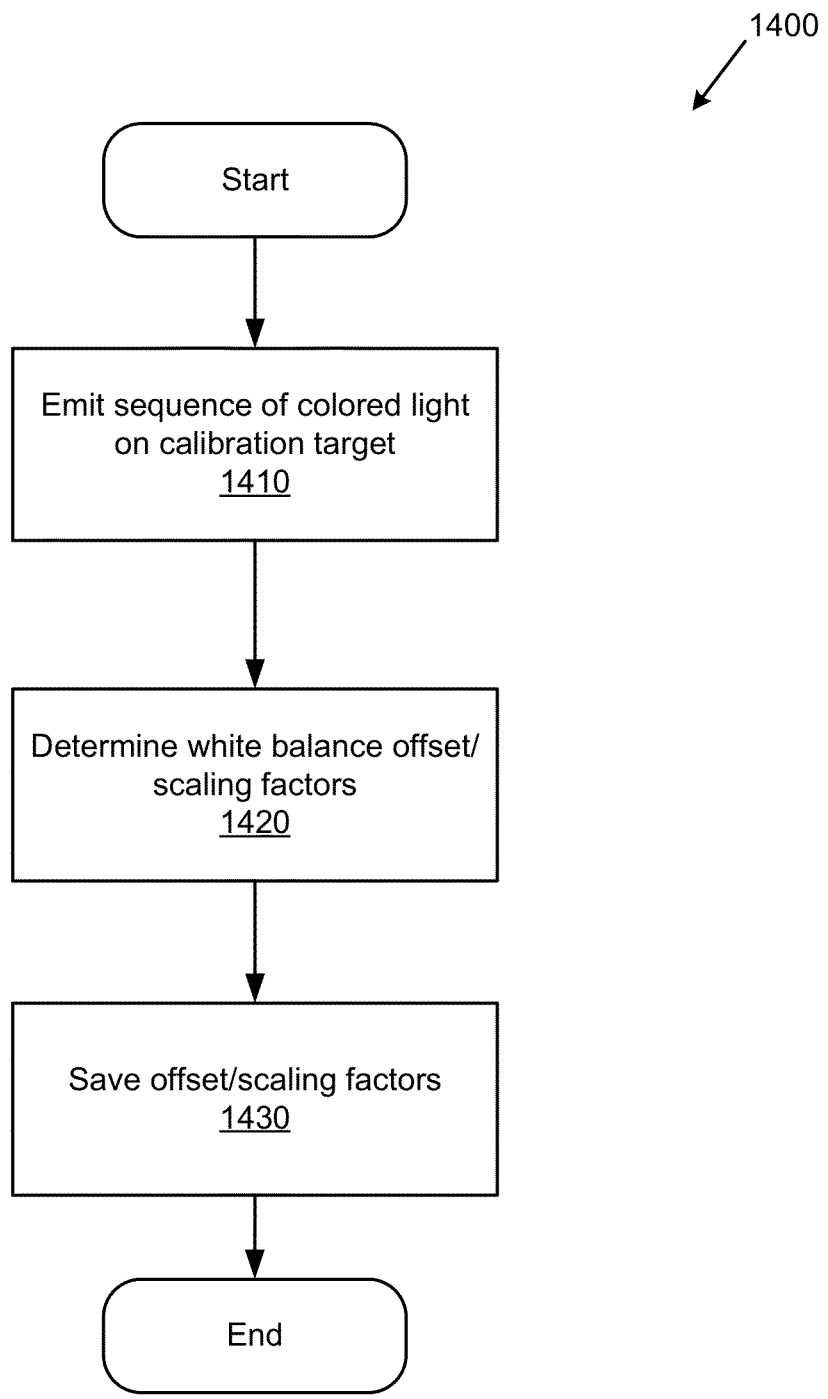
FIG. 14 is a flow diagram showing a color-capture mode calibration method configured to compensate for ambient light hues, such as the blue-hued ambient light of FIGS. 5A-6C.

In other examples, the color temperature of ambient light 525 may be slightly red or green toned, depending on the source of the ambient light, e.g., daylight, fluorescent bulbs, tungsten incandescent lighting, or other sources. In any case, the effects of ambient light can be mitigated with white-balance calibration, explained below with respect to FIGS. 11 and 14. Furthermore, under normal operating conditions, light generated by illumination source 170 is typically on the order of 20 times greater than any ambient light 525 due to a relatively narrow imager exposure time that is typically less than 300 μs. Notwithstanding this difference, the example white-balance calibration routine is provided to facilitate control and mitigation of any ambient light 525 effects (FIG. 14). In addition, such a calibration routine also corrects and controls for color variations within illumination source 170 itself, and establishes a white baseline by which to normalize and scale monochrome data.

FIGS. 6A, 6B, and 6C correspond to FIGS. 4A, 4B, and 4C with the addition of ambient light 525. The effects of ambient light 525 are similar to those previously described. For example, histograms $645_R$, $645_G$, and $645_B$ indicate that additional intensity produced by ambient blue light 540 is reflected by cyan module 405 and magenta module 410.

Figure 7B:
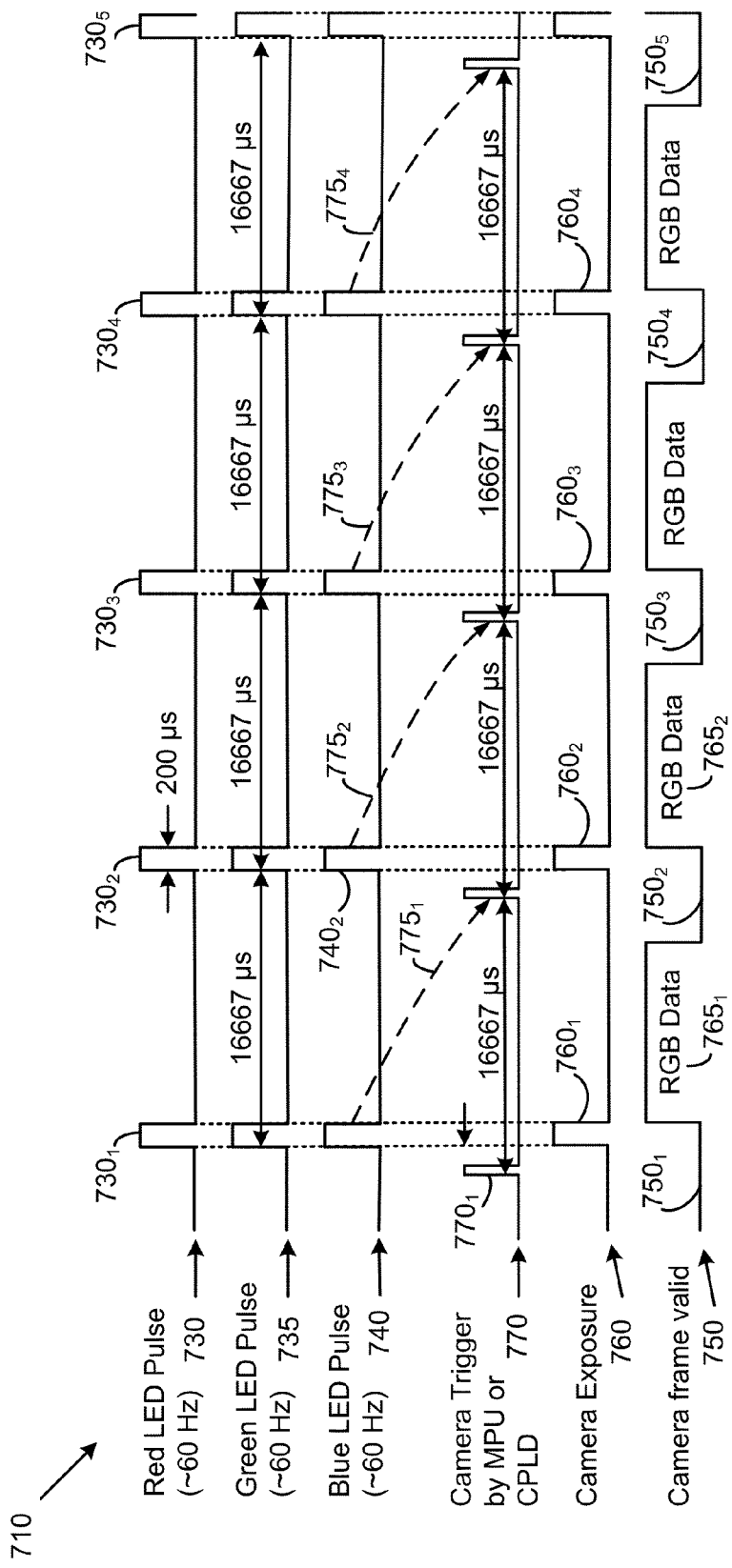

FIGS. 7A and 7B are, respectively, a high-level timing diagram 700 and a low-level timing diagram 710 showing a monochrome-capture mode having concurrent (i.e., temporally aligned) red LED control pulses 730, green LED control pulses 735, and blue LED control pulses 740, with individual pulse widths in a range from approximately 100 microseconds (μs) to approximately 300 μs, and individually cycled at a rate of at least 60 Hz. FIG. 7A shows three complete cycles, with subscripts 1-3 that denote a particular cycle. An additional two cycles are shown in FIG. 7B (i.e., subscripts 4 and 5). FIG. 7A depicts coincident RGB control pulses 730-740 as a stack of blocks, while FIG. 7B depicts conventional pulse shapes; however, the two depictions are functionally equivalent.

In the monochrome-capture mode of FIGS. 7A and 7B, different colors of light are concurrently pulsed so that the pulses of light are emitted simultaneously. For example, LED control pulses 730-740 are shown as stacked in FIGS. 7A and 7B to indicate that they facilitate concurrent (or substantially overlapping) artificial illumination. Coincident colored light during each cycle may be used to produce a frame of monochrome image-sensor data that can be processed to decode non-color barcodes, such as UPC 210 (FIG. 2A); however, this data is not typically used for decoding color barcodes because the colored light is not temporally spaced apart to produce a sequence of colored light representative of color-image data. Thus, the monochrome-capture mode example of FIG. 7A produces concurrent RGB light that is additive to form pulsed white light. This white light is typically pulsed at a rate of about 60 Hz, which exceeds a human flicker-fusion threshold and therefore appears as solid white light. In other words, concurrent pulses 730-740 are rapidly repeated at a rate exceeding a human's ability to perceive the gaps between the pulses and therefore appear as a uniform color, i.e., free from perceptible flickering. For most people, light pulsed at a frequency in excess of 50 Hz will exceed their so-called flicker fusion frequency and no flicker effect will be perceived. The flicker fusion frequency of human vision typically ranges from as low as about 15 Hz to as high as about 65 Hz. To avoid flicker fusion, U.S. Pat. No. 7,234,641 discloses pulsing the light at a sufficiently high frequency (e.g., in excess of 50 Hz) to avoid the flicker effect. In other embodiments, only one color of LED is pulsed, a separate white LED is pulsed, or one or more LEDs are activated but not pulsed to reflect from a barcode and produce monochrome image-sensor data as follows.

FIGS. 7A and 7B show monochrome imager 120 is operable to produce image sensor data in response to frame-valid pulses 750 being in a low state (a digital logic level typically associated with zero Volts). Image sensor data is generated during camera exposure pulses 760 (FIG. 7B), which are also depicted as integration periods 755 (FIG. 7A). In response to the conclusion of integration periods 755 (i.e., completion of camera exposure pulses 760), frame-valid pulses 750 transition to a high state (a digital logic level typically associated with a predetermined positive Voltage) and image sensor data is read out from imager 120 during data read out periods 765. The duration of data read out periods 765 is a function of imager 120 hardware capabilities and imager configuration settings, i.e., image resolution, size, or other settings. After a sufficient time has elapsed for a data read out and monochrome imager 120 is once again capable of imaging, frame-valid pulse 750 transitions back to the low state, i.e., the valid or integration state, to indicate imager 120 is operable to produce another frame of data. The duration of such valid states depends on imager 120 frame rate capabilities, the duration of data read out periods 765, and the desired timing of camera exposure pulses 760.

Figure 8:
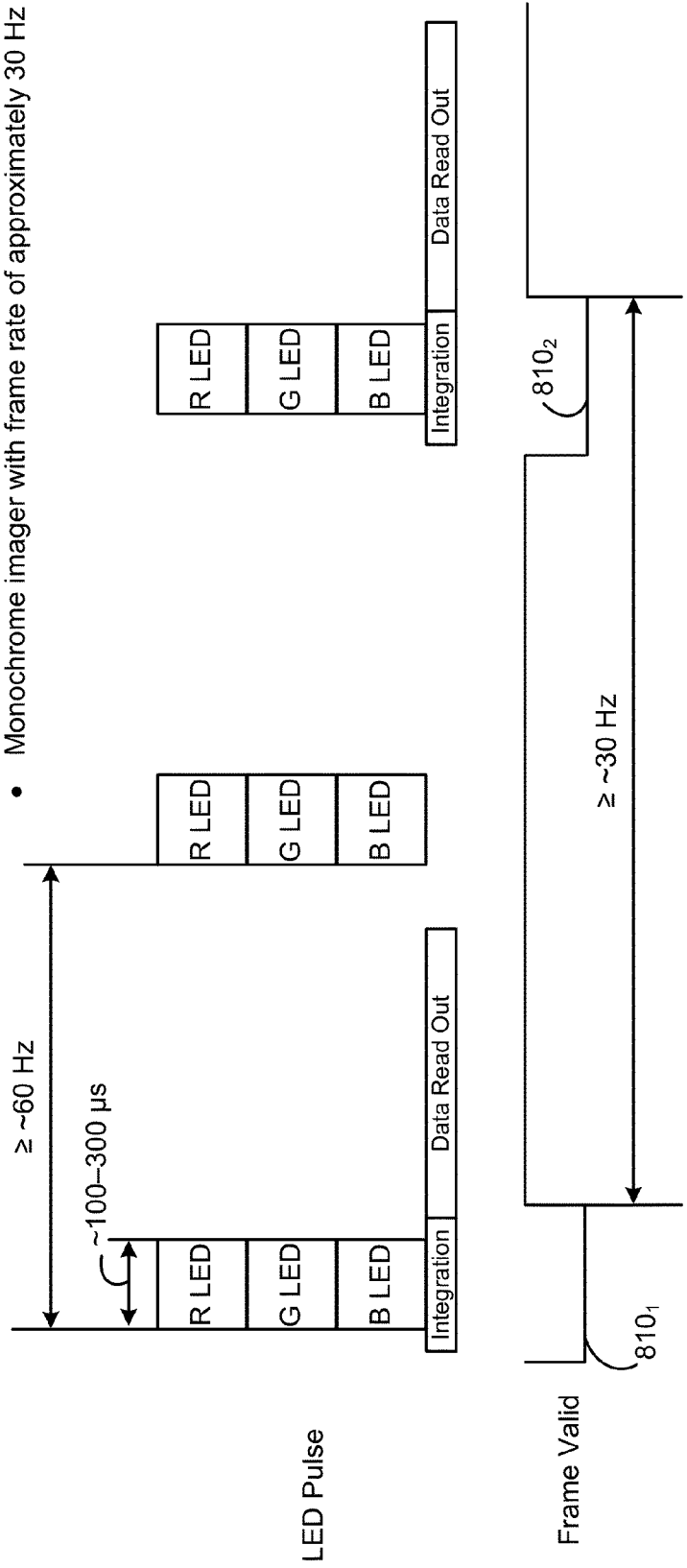
FIG. 8 is a high-level timing diagram of the monochrome-capture mode shown in FIGS. 7A and 7B having a frame rate of approximately 30 Hz.

The desired timing of camera exposure pulses 760 is configurable and initiated by a sequence of camera trigger pulses 770 (FIG. 7B). In the example shown, camera trigger pulses 770 lead camera exposure pulses 760 by approximately 28 μs, which is not shown to scale due to its relatively short duration. This relatively small 28 μs delay may be predetermined (i.e., hardware specific), dynamically configured, or preconfigured. In any case, subsequent to such a delay, camera exposure pulses 760 are synchronized to form a cycle by coinciding with control pulses 730-740 during corresponding frame-valid pulses 750. Thus, an exemplary monochrome-capture mode cycle includes the following sequence of events: LEDs 330-340 receive pulses 730-740, light is collectively emitted by LEDs 730-740 and reflected by an object (e.g., a black and white optical code), the reflected light is received by monochrome imager 120 during camera exposure pulses 760, monochrome image-sensor data is read out during period 765, and the data is processed to decode any visible barcodes. Arrows 775 indicate a subsequent monochrome-capture mode cycle may be synchronized in response to preceding blue LED control pulses 740 (or other pulses) to produce a 16,667 μs period between camera trigger pulses 770, i.e., a 60 Hz frame rate. Although the frame rate of FIG. 7B is approximately 60 Hz, various frame rates are contemplated and included in the scope of this disclosure. For example, FIG. 8 shows a monochrome-capture mode timing diagram using 60 Hz LED pulses 730-740 in conjunction frame-valid pulses $810_1$ and $810_2$ operating at an approximate 30 Hz frame rate.

Figure 9B:
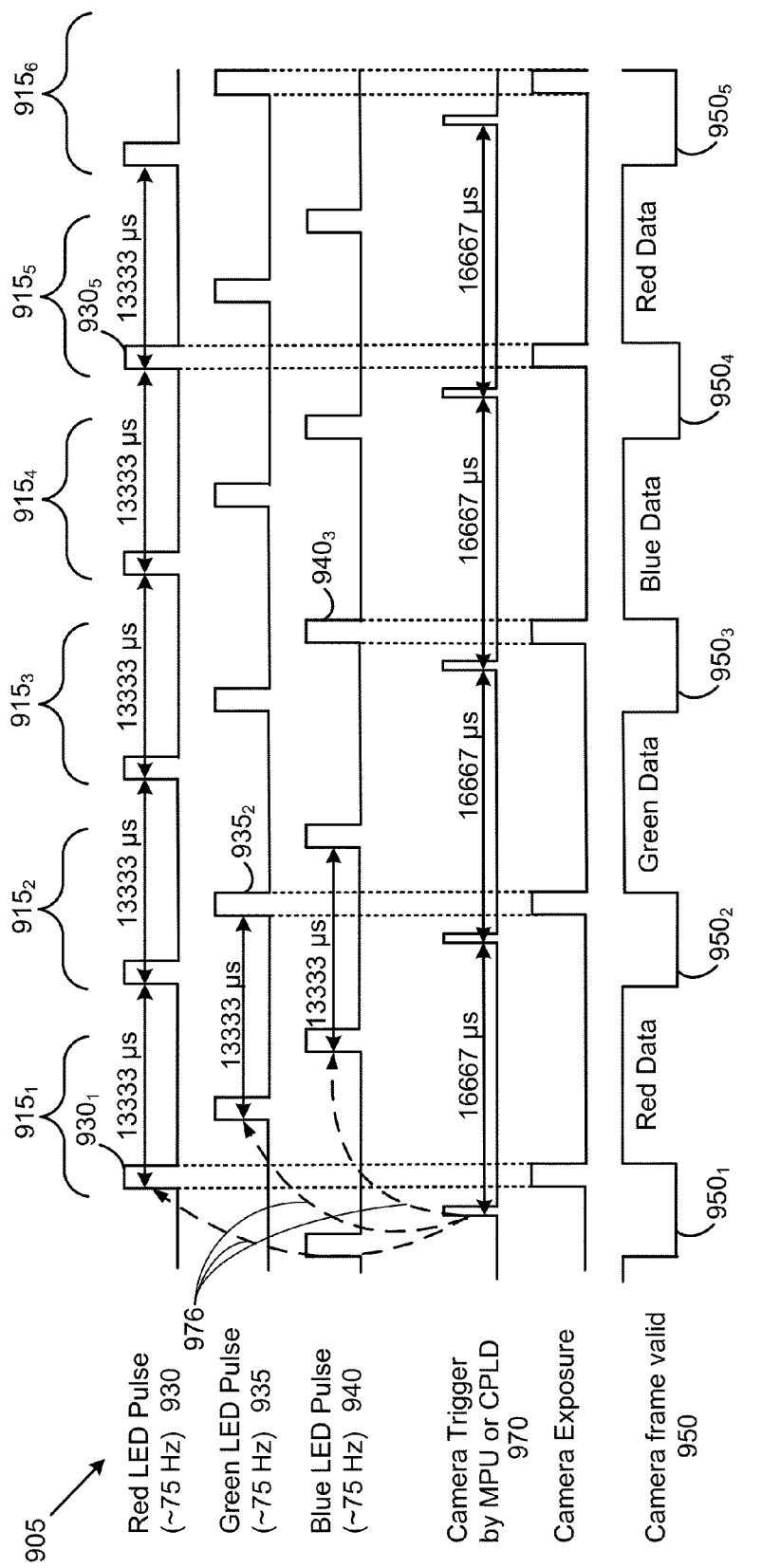
Figure 9C:
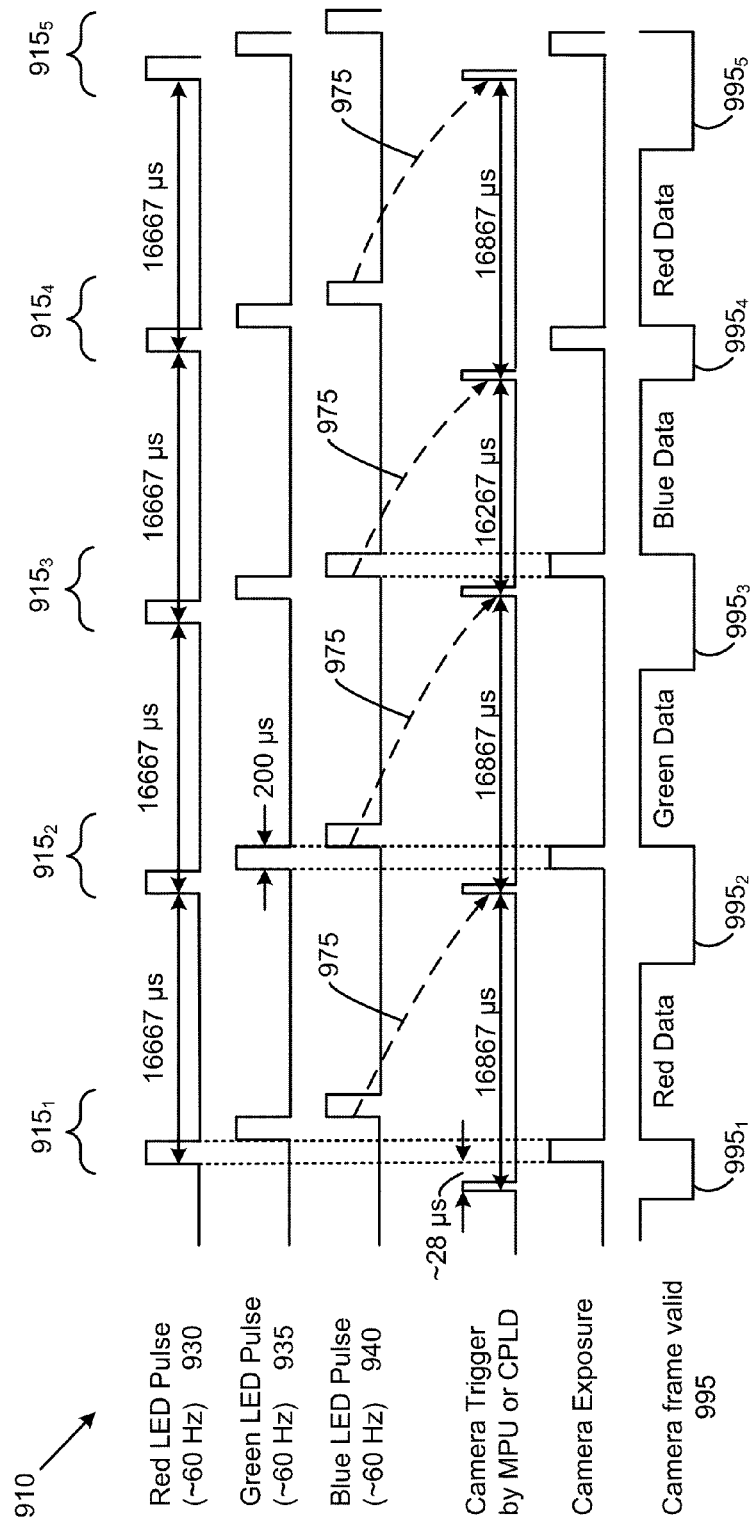

FIGS. 9A, 9B, and 9C show respective color-capture mode timing diagrams 900, 905, and 910 having RGB sequences 915. Each RGB sequence 915 is denoted by one of subscripts from 1 to 4, with FIGS. 9B and 9C including a fifth sequence, and FIG. 9B also including a portion of a sixth sequence. RGB sequences 915 include red LED pulses 930, green LED pulses 935, and blue LED pulses 940. As with FIGS. 7A-8, LED pulses 930-940 have pulse widths that range from approximately 100 μs to approximately 300 μs, with individual LED pulses including subscripts identifying the associated sequence. In contrast to the monochrome-capture mode of FIGS. 7A-8, LED pulses 930-940 are temporally spaced apart, i.e., without overlap and including approximately ten μs between adjacent LED pulses. In some embodiments, LED pulses 930-940 may have a negligible gap between adjacent LED pulses or even include a slight overlap without materially affecting the image sensor data.

In the embodiments of FIGS. 9A and 9B, LED pulses 930-940 operate at approximately 75 Hz to produce the appearance of white light, with 60 Hz frame-valid pulses 950 aligning on every fourth LED pulse to sequentially produce red data in a first RGB sequence, green data in a second RGB sequence, and blue data in a third RGB sequence. For ease of description, frame-valid pulses 950 include subscripts to identify the relative order of frame-valid pulses 950 in timing diagrams 900-910. For example, a first frame-valid pulse $950_1$ is aligned with a red LED pulse $930_1$ during a first RGB sequence $915_1$ to produce red-light monochrome data (e.g., $300_R$, FIG. 3A), a second frame-valid pulse $950_2$ is aligned with a green LED pulse $935_2$ of a second RGB sequence $915_2$ to produce green-light monochrome data (e.g., $300_G$, FIG. 3B), and a third frame-valid pulse $950_3$ is aligned with a blue LED pulse $940_3$ to produce blue-light monochrome data (e.g., $300_B$, FIG. 3C). Due to the different frequencies between LED pulses 930-940 and frame-valid pulses 950, FIGS. 9A and 9B also show that a fourth RGB sequence $915_4$ does not align with a frame-valid pulse. Instead, as shown in FIG. 9B, a second frame of red-light monochrome data is produced when a red LED pulse $930_5$ of a fifth RGB sequence $915_5$ aligns with a fourth frame-valid pulse $950_4$, and so on. As explained with respect to FIG. 7B, camera trigger pulses 970 may be synchronized according to blue LED pulses 940, as indicated by arrows 975 in FIG. 9C. In other embodiments, camera trigger pulses 910 may be synchronized according to LED pulses 930 or 935. Or, camera trigger pulses 970 may be used as the synchronization mechanism (FIG. 9B) as indicated by arrows 976.

In contrast to FIGS. 9A and 9B, red, green, and blue LED pulses 980-990 of FIG. 9C each operate at approximately 60 Hz instead of 75 Hz, with frame-valid pulses 995 operating at an average rate of approximately 60 Hz. Thus, timing diagram 910 of FIG. 9C shows that no RGB sequence is skipped or passed over as in the case of fourth RGB sequence $915_4$ of FIG. 9B. However, because each RGB sequence 915 of FIG. 9C is used to produce data, frame-valid pulses 995 are not all equal in duration so that they properly align with LED pulses 980-990. For example, every third frame-valid pulse, e.g., frame-valid pulses $995_1$ and $995_4$, has a slightly shorter duration than intermediate frame-valid pulses $995_2$ and $995_3$. Furthermore, MPU 110 (FIG. 1B) or other suitable device may be used to control the timing pattern of camera trigger pulses 970 and align frame-valid pulses 995 with LED pulses 930-940 (FIG. 9B), or with LED pulses 980-990 (FIG. 9C), or according to another control scheme.

Figure 10:
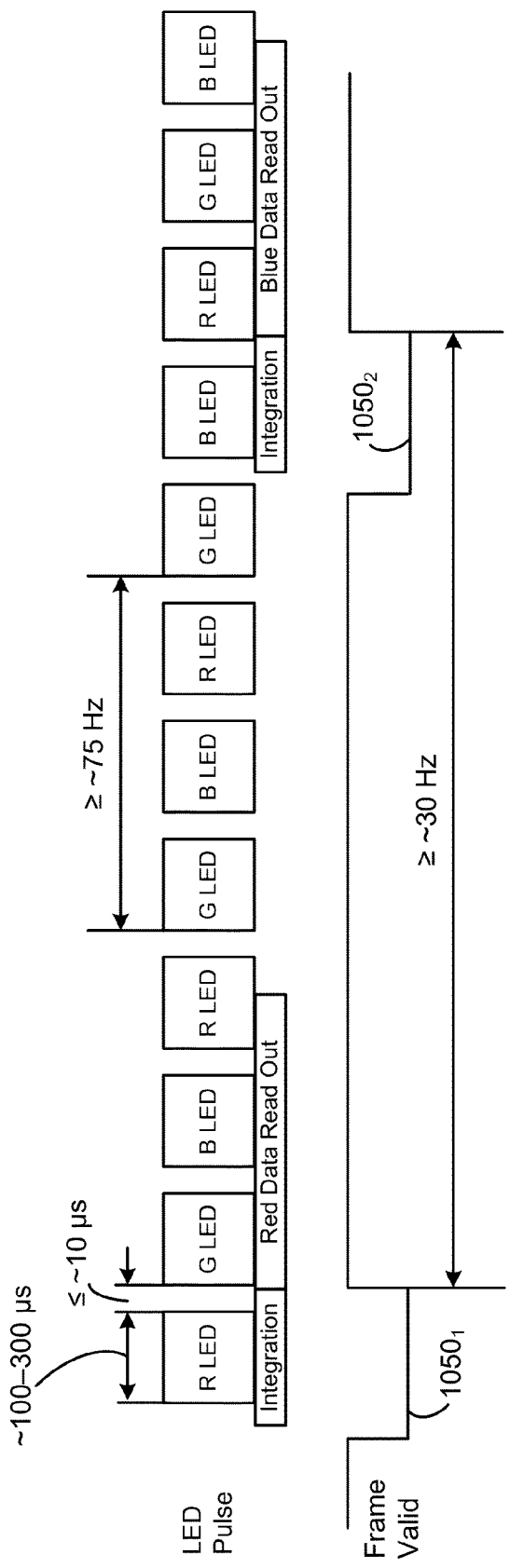
FIG. 10 is a high-level timing diagram of the color-capture mode shown in FIGS. 9A and 9B having a frame rate of approximately 30 Hz.

Although FIGS. 9A, 9B, and 9C each show frame rates that correspond to approximately 60 Hz, various frame rates are contemplated and included in the scope of this disclosure. For example, FIG. 10 shows a color-capture mode timing diagram having 75 Hz LED pulses 930-940 and frame-valid pulses $1050_1$ and $1050_2$ operating at approximately 30 Hz.

Figure 11:
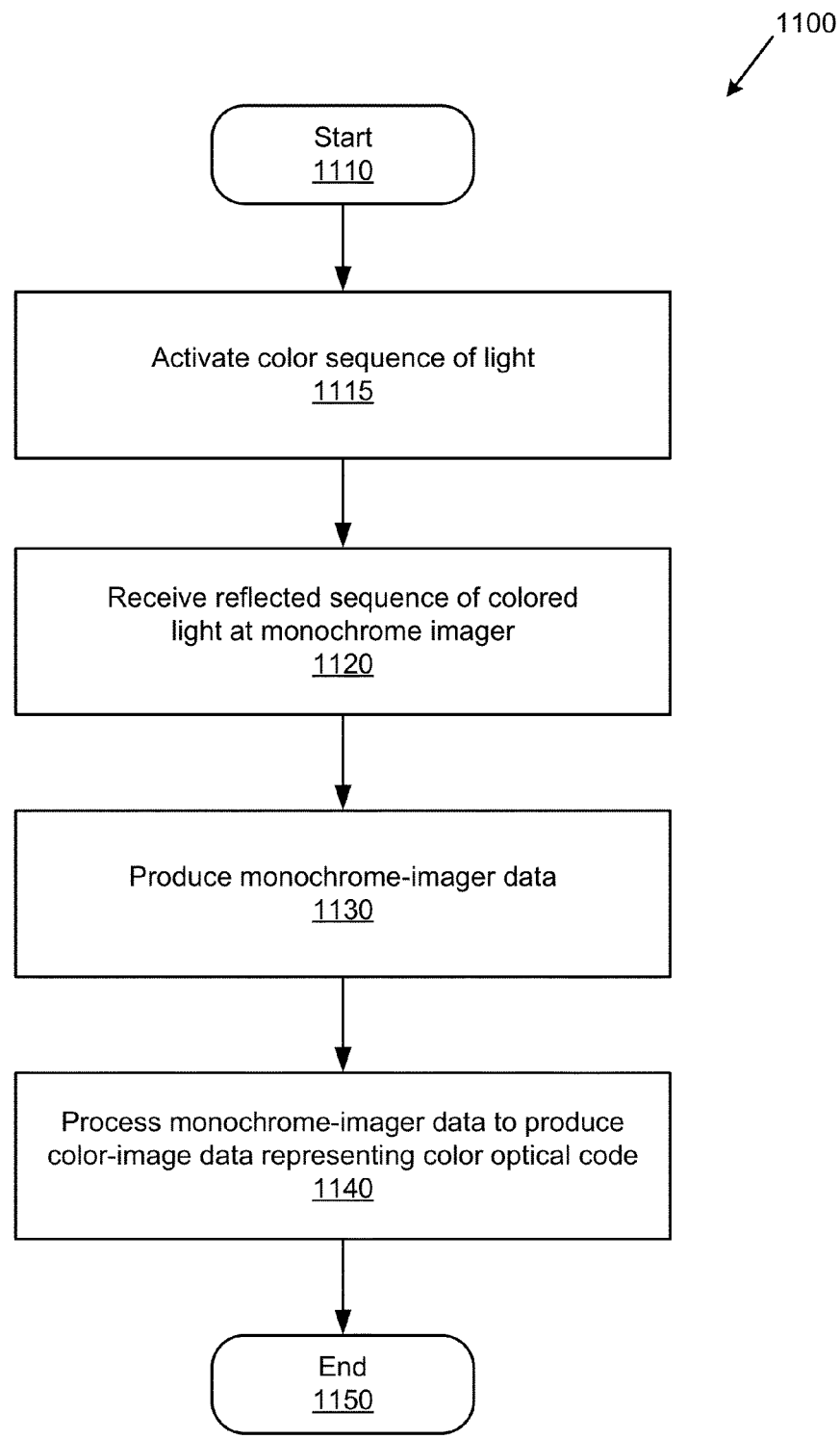
FIG. 11 is a flow diagram showing a color-capture mode process configured to produce monochrome image-sensor data representing a color optical code or other color object.

With any of the previous examples, a sequence of colored light may also be used to produce a single frame of monochrome image-sensor data that can be processed to decode non-color barcodes, such as UPC 210 (FIG. 2A), or a sequence of monochrome image-sensor data corresponding to colored lights may be used to represent color-image data and decode color optical codes, such as HCCB 230 (FIG. 2B). For example, FIG. 11 is a flow diagram showing a color-capture mode 1100 for producing color-image data representing a color optical code. At step 1110 data reader 100 (FIG. 1A) is activated manually by trigger 160 (FIG. 1B) or automatically by processor 110 in response to detecting an item bearing a color optical code visible within the read volume (not shown).

At step 1115, illumination source 170 or another external artificial light source is activated and emits light as a sequence of colored light as previously described. For example, an RGB sequence may be emitted as described with reference to FIGS. 9A-10, but other suitable sequences, timings, and colored lights may be used as well. In some embodiments, including embodiments with external illumination sources, e.g., a checkstand with a separately controlled illumination source, step 1115 may be performed as a separate step apart from method 1100.

Step 1120 includes receiving at the monochrome imager (e.g., monochrome imager 120 of FIG. 1B), at least a portion of a sequence of colored light that is emitted by artificial light source 170 and reflected from the color optical code. In other words, some of the emitted light may be absorbed by the color optical code, and some of the emitted light may be reflected and absorbed by monochrome imager 120.

Step 1130 includes producing monochrome image-sensor data based at least in part on the portion of the reflected sequence of colored light received at the monochrome imager. As described with reference to FIGS. 3A-6C and 9A-10, differently colored light may be sequenced and directed to monochrome imager 120 to produce data that corresponds to the individual colors of the colored object being imaged.

Step 1140 includes processing the monochrome image-sensor data to produce color-image data representing the color optical code. Processing at step 1140 may include formatting the monochrome image-sensor data into color coordinates as described above, preparing luminance and two or more chrominance channels, or formatting the data as a conventional color-image file format. For example, the color coordinates described above may be assembled for each pixel sensor and configured according to JPEG, PNG, GIF, BMP, or various other suitable image file formats. Formatting the monochrome image-sensor data is optional, but may be included so that other systems can readily access and interpret the data according to conventional file formats and interfaces.

Processing at step 1140 may also include normalizing each frame of data according to a white-balance configuration setting. Normalization provides a mechanism for correcting disparities in the detected intensity of the reflected light that are caused by changes in the characteristics of the emitted or reflected light, e.g., changes in artificial light source 170. These changes may be due to various factors including the distance between artificial light source 170 and the color optical code, drift in the optical output intensity of color LEDs or other color light sources, aging of light sources causing distortion in the specified wavelengths of emitted light, changes in ambient light conditions over time (e.g., daylight v. nighttime), or various other factors. Normalization helps mitigate such factors by scaling received reflection data according to predetermined white-balance correction coefficients that provide a reliable reference by which to assess the monochrome image-sensor data generated during each portion of an RGB sequence.

White-balance correction coefficients include gain as well as offset correction and typically include different values for different colors of emitted light in the sequence of colored light. In some embodiments, red LED reflected light may be scaled in a range from one to three, green LED reflected light may be scaled in a range from one to three, and blue LED reflected light may be scaled in a range from one to three. These ranges are examples and scaling coefficients may vary over time as different light sources are used or as ambient light conditions change. For example, according to one embodiment, a drive circuit provides constant current to LEDs 185 resulting in changes over time in LED optical output intensity. Therefore, white-balance coefficients are calibrated periodically, e.g., every six months. Thus, in one embodiment, a calibration timer in data reader 100 is included to signify that a calibration is due (see e.g., FIG. 14), at which point data reader 100 may audibly alert a user via speakers (not shown) or may visually alert a user via LEDs 185 or other indicators. In other embodiments, periodical calibration is optional. For example, LEDs 185 may be driven with a constant optical output intensity that is monitored and regulated via a photodiode (not shown) configured to dynamically adjust the drive current.

Step 1140 may also include various other image enhancements including sharpening, motion compensation among data frames using edge detection or other techniques, scaling, and cropping. Motion estimation may be used to account and correct for movement (e.g., sweep) of an optical code between frame-valid pulses for the red, green, and blue portions of the RGB sequences. Processing is complete at step 1150 and monochrome image-sensor data may be used to represent the color optical code (or any other color object).

Figure 12:
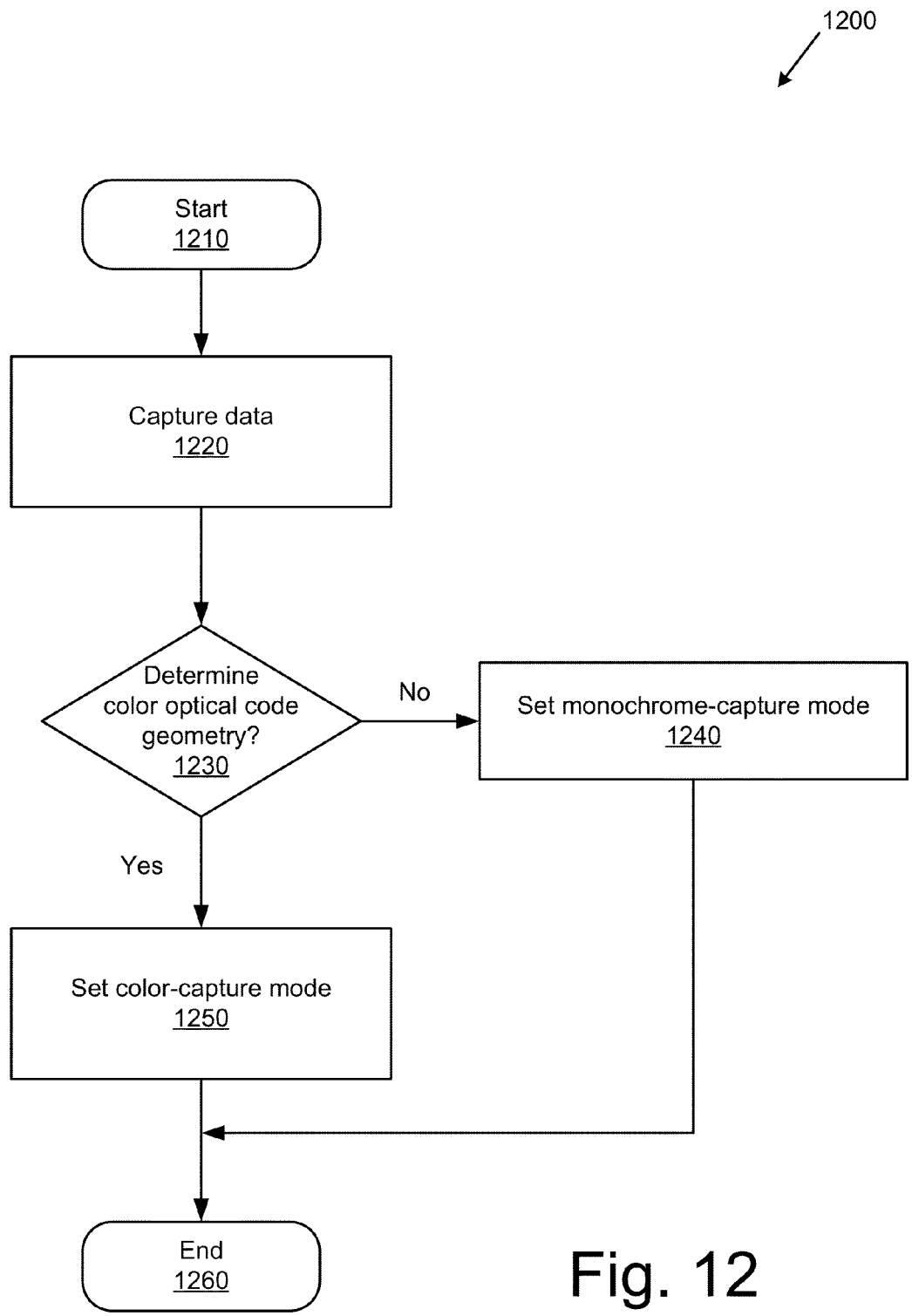
FIG. 12 is a flow diagram showing a method of dynamically switching between a monochrome-capture mode and a color-capture mode in response to registering the geometry of an optical code.

FIG. 12 is a flow diagram showing a method 1200 of dynamically switching between a monochrome-capture mode and a color-capture mode in response to the geometry of an optical code. Starting at step 1210, data reader 100 is activated in a similar manner as described in step 1110.

Next, step 1220 includes capturing data representing an optical code. The captured data can be captured in either the monochrome-capture mode as described with respect to FIGS. 7A-8, or the color-capture mode as described with respect FIGS. 9A-10. In color-capture mode, however, one color in the RGB sequence (i.e., one exposure) is sufficient for purposes of dynamically switching with method 1200.

Next, step 1230 includes determining whether an optical code includes color (or non-color) code geometric features. The geometry of the optical code may be detected using various conventional image recognition techniques. For example, vertices or edges of triangular symbols in an HCCB are detected to indicate a color optical code. In other embodiments, different aspect ratios may be detected, or other features may be used to identify a color or non-color code.

If no color optical code geometric features are determined, step 1230 proceeds to step 1240 that includes setting data reader 100 to monochrome-capture mode if data reader 100 is not currently set to or at that mode. Assuming the mode is switched at step 1240, a subsequent frame-valid pulse is timed to coincide with one or more lights to produce monochrome image-sensor data representing a non-color optical code as described with respect to FIGS. 7A-8.

Conversely, if color optical code geometric features are determined, step 1230 proceeds to step 1250 that includes setting data reader 100 to color-capture mode if data reader 100 is not currently set at that mode. Assuming the mode is switched at step 1250, a subsequent frame-valid pulse is timed to coincide with a colored light among the RGB sequence to produce red-, green-, or blue-light monochrome image-sensor data as described with respect to FIGS. 9A-10. A complete RGB sequence of data is used to represent a color optical code. With the correct mode set, method 1200 ends (step 1260).

Figure 13:
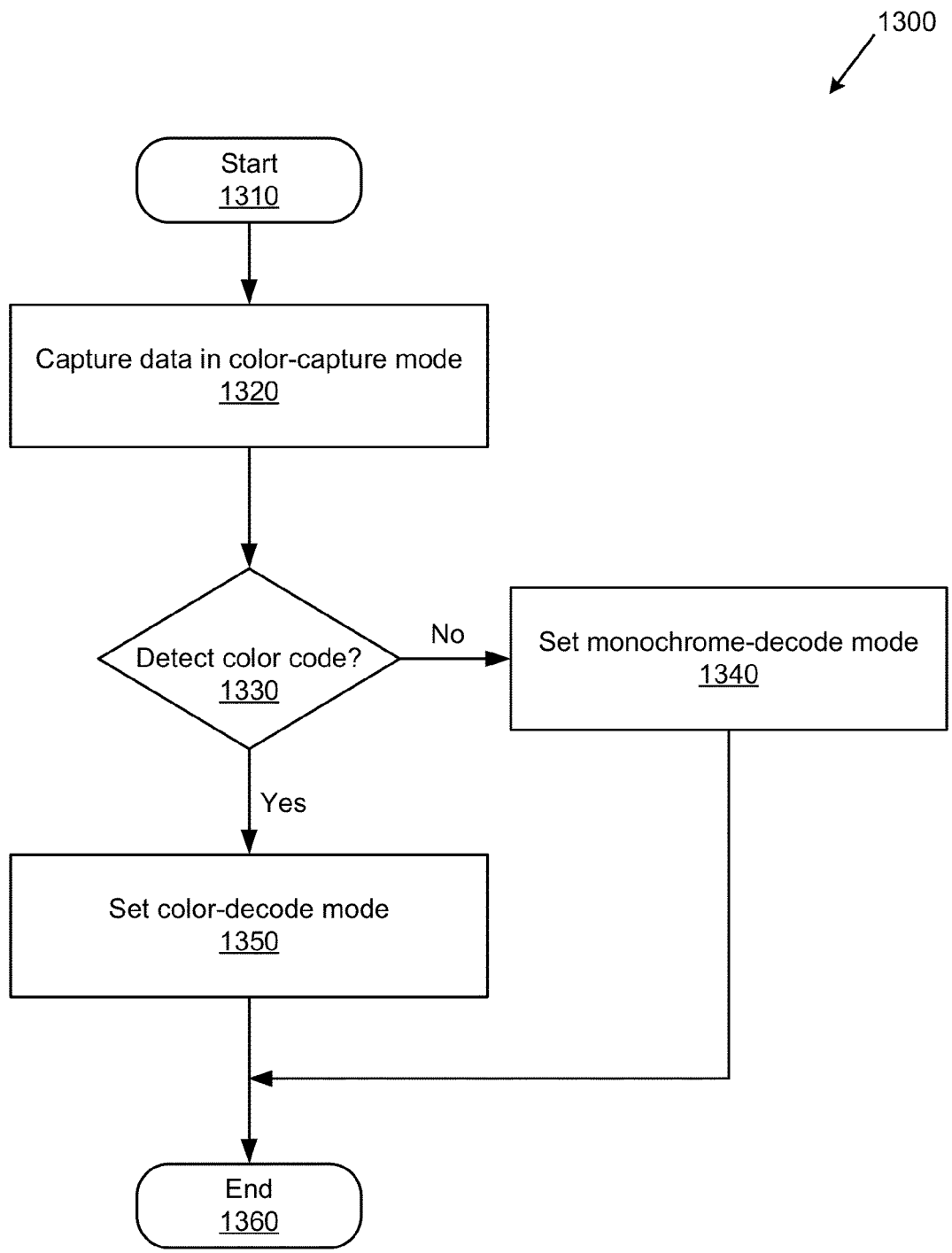
FIG. 13 is a flow diagram showing a method of using monochrome image-sensor data obtained in a color-capture mode to facilitate dynamic switching to a monochrome-decoding mode or a color-decoding mode in response to detecting differences between monochrome image-sensor data obtained using a sequence of colored light.

FIG. 13 is a flow diagram showing a method 1300 of using monochrome image-sensor data obtained in a color-capture mode to facilitate dynamic switching to a monochrome-decoding mode or a color-decoding mode in response to detecting color in an optical code. Starting at step 1310, data reader 100 is activated in a similar manner as described in step 1110.

Next, step 1320 includes capturing data in color-capture mode. For example, red-, green- and blue-light monochrome image-sensor data is obtained as described previously (FIGS. 9A-10). In some embodiments, data is obtained from just two colors of light to save additional time during step 1320. For example, in some embodiments, two colors of light may be sufficient to resolve each color used in the optical code palette, or two colors are be capable of indicating that the optical code is monochromatic and not colored.

Next, step 1330 includes detecting a color code by comparing similar regions of two or more different monochrome image-sensor data samples that represent the same optical code under different color light. For example, similar portions of red-bar data $305_R$ (representing red module 305 under a red light) and red-bar data $305_G$ (representing red module under a green light) can be compared to determine whether optical code 300 produces sufficiently different image sensor data under red and green light, thereby indicating that optical code 300 includes color modules 305-320. In some embodiments, multiple data locations are compared to reduce the likelihood of a false-positive, i.e., locations that are not colored, but have produced different intensity values under different colors of light. In other embodiments, the monochrome image-sensor data is sub-sampled and the subsamples resulting from different light are compared to obtain a broader sample of locations to compare and determine if an optical code includes color. For example, square blocks of 32×32 pixels (or some other arbitrary size) are selected from monochrome image-sensor data generated under different colored lights, pixel values of each block are averaged, and average values for similarly located blocks are compared to determine whether an optical code includes color.

If only minor intensity differences are detected under different colors of light, step 1330 proceeds to step 1340 that includes setting data reader 100 to use a monochrome-decode mode (assuming that mode is not already set). Monochrome-decode mode includes conventional techniques for recognizing and decoding non-color optical codes, such as with UPC 210. Conversely, if sufficient intensity differences are detected, step 1330 proceeds to step 1350 that includes setting data reader 100 to use a color-decode mode (assuming that mode is not already set). Color-decode mode includes obtaining any additional image sensor data needed to represent the color optical code under each light in the sequence and configuring data reader 100 to decode a color optical code. Method 1300 ends at step 1360, which may include decoding the color or non-color optical code, or processing the data into an image format, for example, for displaying or decoding on an external device.

FIG. 14 is a flow diagram showing a color-capture mode calibration method 1400 configured to compensate for various emitted and reflected light factors, such as the blue-hued ambient light example of FIGS. 5A-6C. Step 1410 includes emitting onto a calibration target (e.g., a piece of white paper), a sequence of colored light to obtain monochrome image-sensor data corresponding to the individual colored lights in the sequence. The sequence may be an RGB sequence according to the 60 Hz color-capture mode, or the sequence may operate at a slower rate so a user can observe the individual colors among the sequence. Calibration can be initiated by a button actuation, by a host command entered at a point of sale device, or by other suitable means.

Next, step 1420 includes determining white balance offsets and scaling coefficients. For example, as red, green, and then blue light is reflected from the white paper, data reader 100 can determine corresponding representative maximum intensity values for each color of light at a given target distance, under an (optional) ambient light condition and a specified target surface reflectivity. These coefficients may then be used to establish ratios of reflected intensities between each of the colors. The normalization coefficients can be used to amplify, attenuate, scale, offset, or otherwise calibrate some intensity values associated with specific colors in the sequence of colored light. For example, if a blue hue is detected during calibration, intensity values associated with the blue LED during data reading can be offset and scaled, i.e., normalized, to generate comparable maximum and minimum intensity values as the other colors of light produced by the different color LEDs among LEDs 185.

Next, step 1430 includes saving the normalization coefficients associated with colors in the sequence of colored light for use in processing monochrome image-sensor data during the color-capture mode. The normalization coefficients can be stored as individual equations or as tables for each color in the sequence. As mentioned previously, the scaling coefficients can be mapped to the image by setting the imager gain (analog or digital) accordingly for R, G, B data sets.

Some features or advantages disclosed herein include one or more of the following: reading and decoding color optical codes with a monochrome imager; providing a data reader status indicia by emitting colored light using an artificial light source that also is used to produce a sequence of colored light for reading color optical codes using a monochrome-imager; illuminating an object with different colors of light in a sequence that is rapidly pulsed at a sufficiently fast rate to appear to a human as solid in color, while using the pulsed colored light to reflect from an optical code thereby producing monochrome image-sensor data representative of colored objects (e.g., HCCBs); determining whether an optical code is monochromatic or colored by comparing differences between corresponding locations of different monochrome image-sensor data frames that each correspond to intensity of reflected light emitted from colored artificial light sources; and dynamically switching between monochrome-capture mode and color-capture mode using detected geometric shapes of optical codes.

It will be obvious to those having skill in the art that many changes may be made to the details of the above-described embodiments without departing from the underlying principles of this disclosure. Therefore, the scope of the invention is set forth in the following claims.

The invention claimed is:

1. A method of producing color-image data representing a color object comprising the steps of:
   receiving at a monochrome imager, a sequence of colored light that is reflected from a surface of the color object;
   producing monochrome image-sensor data associated with different colors of light in the sequence of colored light that is reflected from the surface of the color object; and
   processing the monochrome image-sensor data to produce color-image data representing the color object.

2. The method of claim 1, wherein the sequence of colored light comprises a sequence of at least three different colors of colored light that is reflected from the surface of the color object, wherein the step of producing comprises producing the monochrome image-sensor data associated with the at least three different colors of colored light in the sequence of colored light, and wherein the step of processing comprises processing the monochrome image-sensor data to produce the color-image data corresponding to the at least three different colors so as to represent different colors of the color object.

3. The method of claim 2, wherein the sequence of the at least three different colors of colored light comprises:
   first light having a first wavelength range;
   second light having a second wavelength range;
   third light having a third wavelength range, the first, second, and third wavelength ranges being substantially non-overlapping wavelength ranges; and
   wherein the color object has three or more colors having corresponding wavelength ranges, at least some of the corresponding wavelength ranges being between at least some of the first, second, and third wavelength ranges.

4. The method of claim 2, wherein the sequence of the at least three different colors of colored light comprises a sequence of three primary colors, and wherein the color object has three or more primary colors that are different than the three primary colors of the sequence.

5. The method of claim 2, further comprising the step of:
   generating the sequence of the at least three different colors of colored light by individual emission of primary colored lights from an artificial light source to form an emitted sequence of colored light.

6. The method of claim 5, wherein the individual emission of primary colored lights cooperatively establishes an appearance of white or uniformly colored light generated from the emitted sequence of colored light.

7. The method of claim 6, wherein the appearance of white or uniformly colored light is generated by cycling the emitted sequence of colored light at a frequency exceeding a flicker fusion threshold.

8. The method of claim 2, wherein the sequence of the at least three different colors of colored light comprises:
   red light having a red wavelength range from approximately 620 nanometers to approximately 740 nanometers;
   green light having a green wavelength range from approximately 490 nanometers to approximately 570 nanometers; and
   blue light having a blue wavelength range from approximately 440 nanometers to approximately 490 nanometers.

9. The method of claim 8, wherein a red light-emitting diode produces the red light, a green light-emitting diode produces the green light, and a blue light-emitting diode produces the blue light.

10. The method of claim 8, wherein the monochrome image-sensor data comprises:
    first luminance information substantially corresponding to luminance of the red light;
    second luminance information substantially corresponding to luminance of the green light; and
    third luminance information substantially corresponding to luminance of the blue light.

11. The method of claim 2, wherein the monochrome imager comprises a global shutter CMOS sensor or a CCD sensor.

12. The method of claim 2, further comprising:
    emitting the sequence of the at least three different colors of colored light from an artificial light source, the sequence of the at least three different colors of colored light being reflected from the surface of the object to produce a reflected sequence of colored light.

13. The method of claim 1, wherein the color object comprises a color optical code having information encoded in a plurality of optical code color modules, each of different ones of the plurality of optical code color modules having a color of one of at least three different colors, the method further comprising the steps of:

decoding from the color-image data the information encoded in the plurality of optical code color modules of the color optical code.

14. The method of claim 1, wherein the monochrome imager has a frame rate of approximately 60 Hertz or greater.

15. A method of producing color-image data representing a color object comprising the steps of:
receiving at a monochrome imager, a sequence of colored light that is reflected from a surface of the color object;
producing monochrome image-sensor data associated with different colors of light in the sequence of colored light that is reflected from the surface of the color object;
determining a white-balance correction value;
adjusting the monochrome image-sensor data based at least in part on the white-balance correction value; and
processing the monochrome image-sensor data to produce color-image data representing the color object.

16. A system for reading a color optical code, the system comprising:
a light source configured to produce light that includes first and second wavelengths;
a color sequence generator configured to emit a color sequence via the light source, the color sequence characterized by a first interval including an emission period of the first wavelength, and a second interval including an emission period of the second wavelength;
a monochrome imager configured to receive the color sequence and produce monochrome image-sensor data substantially corresponding to luminance received during the first and the second intervals; and
a computing device operative to receive the monochrome image-sensor data and to combine them to form one color image representing the color optical code.

17. The system of claim 16, further comprising:
a housing configured to be handheld, wherein the monochrome imager and the light source are disposed within the housing.

18. The system of claim 16, in which the light source is configured to produce light that includes a third wavelength, in which the color sequence is further characterized by a third interval including an emission period of the third wavelength, and in which the monochrome imager is configured to receive the color sequence and produce monochrome image-sensor data substantially corresponding to luminance received during the first, second, and third intervals.

19. The system of claim 18, wherein the first, second, and third wavelengths of light comprise primary colors of light that are configured to be cycled at a frequency exceeding a flicker fusion threshold to cooperatively establish an appearance of uniformly colored light.

20. The system of claim 18, wherein the light source includes a red light-emitting diode operable to produce red light, a green light-emitting diode operable to produce green light, and a blue light-emitting diode operable to produce blue light.

21. The system of claim 16, in which the computing device is configured to:
sample regions of the monochrome image-sensor data,
detect differences between luminance received during the first and second intervals, and
switch between a color mode and a monochrome mode based on the detected differences.

22. The system of claim 21, in which the light source is configured to produce light that includes a third wavelength, in which the color sequence is further characterized by a third interval including an emission period of the third wavelength, in which the monochrome imager is configured to receive the color sequence and produce monochrome image-sensor data substantially corresponding to luminance received during the first, second, and third intervals, and in which the computing device is configured to:
detect differences between luminance received during the first, second, and third intervals, and
switch between the color mode and the monochrome mode based on the detected differences between luminance received during the first, second, and third intervals.

23. A system for reading a color optical code, the system comprising:
a light source configured to produce light that includes first and second wavelengths;
a color sequence generator configured to emit a color sequence via the light source, the color sequence characterized by a first interval including an emission period of the first wavelength, and a second interval including an emission period of the second wavelength;
a monochrome imager configured to receive the color sequence and produce monochrome image-sensor data substantially corresponding to luminance received during the first and the second intervals;
a computing device operative to receive the monochrome image-sensor data and to form color-image data representing the color optical code; and
a selector configured to switch between a color mode and a monochrome mode.

24. The system of claim 23, wherein the selector is dynamically configured to switch between a color mode and a monochrome mode by sampling regions of the monochrome image-sensor data and detecting differences between luminance received during the first and second intervals.

25. A method of producing color-image data representing an object, the method comprising the steps of:
emitting a sequence of colored light that is reflected from the object to produce a reflected sequence of colored light;
receiving at a monochrome imager at least a portion of the reflected sequence of colored light;
producing monochrome image-sensor data based at least in part on the reflected sequence of colored light received; and
processing the monochrome image-sensor data to produce the color-image data representing the object.

26. A system for producing color-image data representing a color object, comprising:
a processor;
a monochrome imager operably coupled to the processor; and
a memory device operably coupled to the processor and storing instructions that, when executed by the processor, configure the system to:
receive at the monochrome imager, a sequence of colored light that is reflected from a surface of the color object;
produce monochrome image-sensor data associated with different colors of light in the sequence of colored light that is reflected from the surface of the color object; and
process the monochrome image-sensor data to produce color-image data representing the color object.

27. A method of dynamically switching a data reading system including a monochrome imager between monochrome-capture mode and color-capture mode in response to geometric features of an optical code, comprising:

capturing data representing an optical code;
determining whether the optical code includes geometric features associated with color or monochromatic optical code types; and
setting the data reading system to color-capture mode in response to the optical code including geometric features associated with a color optical code type, or to monochrome-capture mode in response to the optical code including geometric features associated with a monochrome optical code type.

* * * * *

UNITED STATES PATENT AND TRADEMARK OFFICE
CERTIFICATE OF CORRECTION

| | | |
|---|---|---|
| PATENT NO. | : 8,752,768 B2 | Page 1 of 1 |
| APPLICATION NO. | : 13/678984 | |
| DATED | : June 17, 2014 | |
| INVENTOR(S) | : Gao | |

It is certified that error appears in the above-identified patent and that said Letters Patent is hereby corrected as shown below:

In the Specification

Column 5
Line 22, change "ARMS" to --ARM9--.

Column 6
Line 62, change "$300_R$" to --$300_B$--.

Column 7
Line 36, change "$350_R$" to --$350_B$--.

Column 7
Line 39, change "$350_R$" to --$350_B$--.

Signed and Sealed this
Tenth Day of February, 2015

Michelle K. Lee
*Deputy Director of the United States Patent and Trademark Office*